(12) United States Patent
Wang et al.

(10) Patent No.: US 7,560,510 B2
(45) Date of Patent: *Jul. 14, 2009

(54) NANO-SIZED INORGANIC METAL PARTICLES, PREPARATION THEREOF, AND APPLICATION THEREOF IN IMPROVING RUBBER PROPERTIES

(75) Inventors: Xiaorong Wang, Hudson, OH (US); Georg G. A. Böhm, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 17 days.

This patent is subject to a terminal disclaimer.

(21) Appl. No.: 11/642,124

(22) Filed: Dec. 20, 2006

(65) Prior Publication Data

US 2007/0161754 A1    Jul. 12, 2007

Related U.S. Application Data

(60) Provisional application No. 60/751,788, filed on Dec. 20, 2005.

(51) Int. Cl.
C08L 53/00 (2006.01)
(52) U.S. Cl. .......................................... 525/88
(58) Field of Classification Search ................ 525/88
See application file for complete search history.

(56) References Cited

U.S. PATENT DOCUMENTS

| | | |
|---|---|---|
| 2,531,396 A | 11/1950 | Carter et al. |
| 3,598,884 A | 8/1971 | Wei et al. |
| 3,793,402 A | 2/1974 | Owens |
| 3,840,620 A | 10/1974 | Gallagher |
| 3,972,963 A | 8/1976 | Schwab et al. |
| 4,233,409 A | 11/1980 | Bulkley |
| 4,247,434 A | 1/1981 | Vanderhoff et al. |
| 4,326,008 A | 4/1982 | Rembaum |
| 4,386,125 A | 5/1983 | Shiraki et al. |
| 4,463,129 A | 7/1984 | Shinada et al. |
| 4,543,403 A | 9/1985 | Isayama et al. |
| 4,598,105 A | 7/1986 | Weber et al. |
| 4,602,052 A | 7/1986 | Weber et al. |
| 4,659,790 A | 4/1987 | Shimozato et al. |
| 4,717,655 A | 1/1988 | Fluwyler |
| 4,725,522 A | 2/1988 | Breton et al. |
| 4,764,572 A | 8/1988 | Bean, Jr. |
| 4,773,521 A | 9/1988 | Chen |
| 4,774,189 A | 9/1988 | Schwartz |
| 4,788,254 A | 11/1988 | Kawakubo et al. |
| 4,829,130 A | 5/1989 | Licchelli et al. |
| 4,829,135 A | 5/1989 | Gunesin et al. |
| 4,837,274 A | 6/1989 | Kawakubo et al. |
| 4,837,401 A | 6/1989 | Hirose et al. |
| 4,861,131 A | 8/1989 | Bois et al. |
| 4,870,144 A | 9/1989 | Noda et al. |
| 4,871,814 A | 10/1989 | Gunesin et al. |
| 4,904,730 A | 2/1990 | Moore et al. |
| 4,904,732 A | 2/1990 | Iwahara et al. |
| 4,906,695 A | 3/1990 | Blizzard et al. |
| 4,920,160 A | 4/1990 | Chip et al. |
| 4,942,209 A | 7/1990 | Gunesin |
| 5,036,138 A | 7/1991 | Stamhuis et al. |
| 5,066,729 A | 11/1991 | Srayer, Jr. et al. |
| 5,073,498 A | 12/1991 | Schwartz et al. |
| 5,075,377 A | 12/1991 | Kawakubo et al. |
| 5,120,379 A | 6/1992 | Noda et al. |
| 5,130,377 A | 7/1992 | Trepka et al. |
| 5,169,914 A | 12/1992 | Kaszas et al. |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,290,873 A | 3/1994 | Noda et al. |
| 5,290,875 A | 3/1994 | Moczygemba et al. |
| 5,290,878 A | 3/1994 | Yamamoto et al. |
| 5,329,005 A | 7/1994 | Lawson et al. |

(Continued)

FOREIGN PATENT DOCUMENTS

CA    2127919    3/1995

(Continued)

OTHER PUBLICATIONS

M. Kralik and A. Biffis, "Catalysis by metal nanopraticles supported on functional organic polymers", 2001, Journal of Molecular Catalysis A: Chemical, vol. 177, pp. 113-138.*

(Continued)

*Primary Examiner*—Edward J Cain
(74) *Attorney, Agent, or Firm*—Nathan Lewis; Meredith E. Hooker

(57) ABSTRACT

Provided are enophile functionalized polymer particles, nano-sized inorganic metal particles such as $Al(OH)_3$ particles, and preparations thereof. Also provided is a method of improving the properties of a rubber composition, such as a tire, by formulating the rubber to incorporate nano-sized inorganic metal particles such as $Al(OH)_3$. The composition exhibits improved properties including bonding rubber, tensile strength, tear strength, and wet traction, among others. A novel rubber composition comprising nano-sized inorganic metal particles is also disclosed.

29 Claims, 4 Drawing Sheets

U.S. PATENT DOCUMENTS

| | | |
|---|---|---|
| 5,331,035 A | 7/1994 | Hall |
| 5,336,712 A | 8/1994 | Austgen, Jr. et al. |
| 5,362,794 A * | 11/1994 | Inui et al. .................. 524/496 |
| 5,395,891 A | 3/1995 | Obrecht et al. |
| 5,395,902 A | 3/1995 | Hall |
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A | 10/1995 | Lo et al. |
| 5,514,734 A | 5/1996 | Maxfield et al. |
| 5,514,753 A | 5/1996 | Ozawa et al. |
| 5,521,309 A | 5/1996 | Antkowiak et al. |
| 5,525,639 A | 6/1996 | Keneko et al. |
| 5,527,870 A | 6/1996 | Maeda et al. |
| 5,530,052 A | 6/1996 | Takekoshi et al. |
| 5,580,925 A | 12/1996 | Iwahara et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,627,252 A | 5/1997 | De La Croi Habimana |
| 5,686,528 A | 11/1997 | Wills et al. |
| 5,688,856 A | 11/1997 | Austgen, Jr. et al. |
| 5,707,439 A | 1/1998 | Takekoshi et al. |
| 5,728,791 A | 3/1998 | Tamai et al. |
| 5,733,975 A | 3/1998 | Aoyama et al. |
| 5,739,267 A | 4/1998 | Fujisawa et al. |
| 5,742,118 A | 4/1998 | Endo et al. |
| 5,763,551 A | 6/1998 | Wunsch et al. |
| 5,773,521 A | 6/1998 | Hoxmeier et al. |
| 5,777,037 A | 7/1998 | Yamanaka et al. |
| 5,811,501 A | 9/1998 | Chiba et al. |
| 5,834,563 A | 11/1998 | Kimura et al. |
| 5,847,054 A | 12/1998 | McKee et al. |
| 5,849,847 A | 12/1998 | Quirk |
| 5,855,972 A | 1/1999 | Kaeding |
| 5,883,173 A | 3/1999 | Elspass et al. |
| 5,891,947 A | 4/1999 | Hall et al. |
| 5,905,116 A | 5/1999 | Wang et al. |
| 5,910,530 A | 6/1999 | Wang et al. |
| 5,955,537 A | 9/1999 | Steininger et al. |
| 5,986,010 A | 11/1999 | Clites et al. |
| 5,994,468 A | 11/1999 | Wang et al. |
| 6,011,116 A | 1/2000 | Aoyama et al. |
| 6,020,446 A | 2/2000 | Okamoto et al. |
| 6,025,416 A | 2/2000 | Proebster et al. |
| 6,025,445 A | 2/2000 | Chiba et al. |
| 6,060,549 A | 5/2000 | Li et al. |
| 6,060,559 A | 5/2000 | Feng et al. |
| 6,087,016 A | 7/2000 | Feeney et al. |
| 6,087,456 A | 7/2000 | Sakaguchi et al. |
| 6,106,953 A | 8/2000 | Zimmermann et al. |
| 6,117,932 A | 9/2000 | Hasegawa et al. |
| 6,121,379 A | 9/2000 | Yamanaka et al. |
| 6,127,488 A | 10/2000 | Obrecht et al. |
| 6,147,151 A | 11/2000 | Fukumoto et al. |
| 6,180,693 B1 | 1/2001 | Tang et al. |
| 6,191,217 B1 | 2/2001 | Wang et al. |
| 6,197,849 B1 | 3/2001 | Zilg et al. |
| 6,204,354 B1 | 3/2001 | Wang et al. |
| 6,225,394 B1 | 5/2001 | Lan et al. |
| 6,252,014 B1 | 6/2001 | Knauss |
| 6,255,372 B1 | 7/2001 | Lin et al. |
| 6,268,451 B1 | 7/2001 | Faust et al. |
| 6,277,304 B1 | 8/2001 | Wei et al. |
| 6,348,546 B2 | 2/2002 | Hiiro et al. |
| 6,359,075 B1 | 3/2002 | Wollum et al. |
| 6,379,791 B1 | 4/2002 | Cernohous et al. |
| 6,383,500 B1 | 5/2002 | Wooley et al. |
| 6,395,829 B1 | 5/2002 | Miyamoto et al. |
| 6,420,486 B1 | 7/2002 | DePorter et al. |
| 6,437,050 B1 | 8/2002 | Krom et al. |
| 6,441,090 B1 | 8/2002 | Demirors et al. |
| 6,448,353 B1 | 9/2002 | Nelson et al. |
| 6,489,378 B1 | 12/2002 | Sosa et al. |
| 6,524,595 B1 | 2/2003 | Perrier et al. |
| 6,573,313 B2 | 6/2003 | Li et al. |
| 6,573,330 B1 | 6/2003 | Fujikake et al. |
| 6,598,645 B1 | 7/2003 | Larson |
| 6,649,702 B1 | 11/2003 | Rapoport et al. |
| 6,663,960 B1 | 12/2003 | Murakami et al. |
| 6,689,469 B2 | 2/2004 | Wang et al. |
| 6,693,746 B1 | 2/2004 | Nakamura et al. |
| 6,706,813 B2 | 3/2004 | Chiba et al. |
| 6,706,823 B2 | 3/2004 | Wang et al. |
| 6,727,311 B2 | 4/2004 | Ajbani et al. |
| 6,737,486 B2 | 5/2004 | Wang |
| 6,750,297 B2 | 6/2004 | Yeu et al. |
| 6,759,464 B2 | 7/2004 | Ajbani et al. |
| 6,774,185 B2 * | 8/2004 | Lin et al. .................... 525/191 |
| 6,777,500 B2 | 8/2004 | Lean et al. |
| 6,780,937 B2 | 8/2004 | Castner |
| 6,835,781 B2 | 12/2004 | Kondou et al. |
| 6,858,665 B2 | 2/2005 | Larson |
| 6,861,462 B2 | 3/2005 | Parker et al. |
| 6,872,785 B2 | 3/2005 | Wang et al. |
| 6,875,818 B2 | 4/2005 | Wang |
| 6,908,958 B2 | 6/2005 | Maruyama et al. |
| 6,956,084 B2 | 10/2005 | Wang et al. |
| 7,056,840 B2 | 6/2006 | Miller et al. |
| 7,071,246 B2 | 7/2006 | Xie et al. |
| 7,112,369 B2 * | 9/2006 | Wang et al. ................. 428/403 |
| 7,179,864 B2 | 2/2007 | Wang |
| 7,193,004 B2 | 3/2007 | Weydert et al. |
| 7,205,370 B2 | 4/2007 | Wang et al. |
| 7,217,775 B2 | 5/2007 | Castner |
| 7,238,751 B2 | 7/2007 | Wang et al. |
| 7,244,783 B2 | 7/2007 | Lean et al. |
| 7,291,394 B2 | 11/2007 | Winkler et al. |
| 7,347,237 B2 | 3/2008 | Xie et al. |
| 7,408,005 B2 | 8/2008 | Zheng et al. |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2002/0095008 A1 | 7/2002 | Heimrich et al. |
| 2002/0144401 A1 | 10/2002 | Nogueroles Vines et al. |
| 2003/0004250 A1 | 1/2003 | Ajbani et al. |
| 2003/0032710 A1 | 2/2003 | Larson |
| 2003/0124353 A1 | 7/2003 | Wang et al. |
| 2003/0130401 A1 | 7/2003 | Lin et al. |
| 2003/0149185 A1 | 8/2003 | Wang et al. |
| 2003/0198810 A1 * | 10/2003 | Wang et al. ................. 428/401 |
| 2003/0225190 A1 | 12/2003 | Borbely et al. |
| 2004/0033345 A1 | 2/2004 | Dubertret et al. |
| 2004/0059057 A1 | 3/2004 | Swisher et al. |
| 2004/0127603 A1 | 7/2004 | Lean et al. |
| 2004/0143064 A1 | 7/2004 | Wang |
| 2004/0198917 A1 | 10/2004 | Castner |
| 2005/0101743 A1 | 5/2005 | Stacy et al. |
| 2005/0182158 A1 | 8/2005 | Ziser et al. |
| 2005/0192408 A1 | 9/2005 | Lin et al. |
| 2005/0197462 A1 | 9/2005 | Wang et al. |
| 2005/0203248 A1 | 9/2005 | Zheng et al. |
| 2005/0215693 A1 | 9/2005 | Wang et al. |
| 2005/0228074 A1 | 10/2005 | Wang et al. |
| 2005/0282956 A1 | 12/2005 | Bohm et al. |
| 2006/0084722 A1 | 4/2006 | Lin et al. |
| 2006/0173115 A1 | 8/2006 | Wang et al. |
| 2006/0173130 A1 | 8/2006 | Wang et al. |
| 2006/0235128 A1 | 10/2006 | Bohm et al. |
| 2007/0135579 A1 | 6/2007 | Obrecht et al. |

| | | | |
|---|---|---|---|
| 2007/0142550 | A1 | 6/2007 | Wang et al. |
| 2007/0142559 | A1 | 6/2007 | Wang et al. |
| 2007/0149649 | A1 | 6/2007 | Wang et al. |
| 2007/0185273 | A1 | 8/2007 | Hall et al. |
| 2007/0196653 | A1 | 8/2007 | Hall et al. |
| 2008/0145660 | A1 | 6/2008 | Wang et al. |
| 2008/0149238 | A1 | 6/2008 | Kleckner et al. |
| 2008/0160305 | A1 | 7/2008 | Wang et al. |
| 2009/0048390 | A1 | 2/2009 | Wang et al. |
| 2009/0054554 | A1 | 2/2009 | Wang et al. |

FOREIGN PATENT DOCUMENTS

| | | |
|---|---|---|
| DE | 3434983 | 4/1986 |
| DE | 4241538 | 6/1994 |
| EP | 0143500 | 6/1985 |
| EP | 0255170 | 2/1988 |
| EP | 0265142 | 4/1988 |
| EP | 0322905 | 7/1989 |
| EP | 0352042 | 1/1990 |
| EP | 0472344 | 2/1992 |
| EP | 0540942 | 5/1993 |
| EP | 0590491 | 4/1994 |
| EP | 0742268 | 11/1996 |
| EP | 1031605 | 8/2000 |
| EP | 1099728 | 5/2001 |
| EP | 1134251 | 9/2001 |
| EP | 1273616 | 6/2002 |
| EP | 1321489 | 6/2003 |
| EP | 1783168 | 5/2007 |
| FR | 2099645 | 3/1972 |
| JP | 01279943 | 11/1989 |
| JP | 2191619 | 7/1990 |
| JP | 2196893 | 8/1990 |
| JP | 05132605 | 5/1993 |
| JP | 06248017 | 9/1994 |
| JP | 7011043 | 1/1995 |
| JP | 08199062 | 8/1996 |
| JP | 2000-514791 | 11/2000 |
| JP | 2003-095640 | 4/2003 |
| JP | 2006-072283 | 3/2006 |
| JP | 2006-106596 | 4/2006 |
| JP | 2007-304409 | 11/2007 |
| WO | 91/04992 | 4/1991 |
| WO | 97/04029 | 2/1997 |
| WO | 98/53000 | 11/1998 |
| WO | 00/75226 | 12/2000 |
| WO | 01/87999 | 11/2001 |
| WO | 02/31002 | 4/2002 |
| WO | 02/081233 | 10/2002 |
| WO | 02/100936 | 12/2002 |
| WO | 03/032061 | 4/2003 |
| WO | 03/085040 | 10/2003 |
| WO | 2004/058874 | 7/2004 |
| WO | 2006/069793 | 7/2006 |
| WO | 2008/014464 | 1/2008 |
| WO | 2008/079276 | 7/2008 |
| WO | 2008/079807 | 7/2008 |

OTHER PUBLICATIONS

Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).
Alexandridis, Paschalis et al., "Amphiphilic Block Copolymers: Self-Assembly and Applications", Elsevier Science B.V., pp. 1-435 (2000).
Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).
Antonietti, Markus et al., "Determination of the Micelle Architecture of Polystyrene/Poly(4-vinylpyridine) Block Copolymers in Dilute Solution", Macromolecules, 27, pp. 3276-3281 (1994).
Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).
Bahadur, Pratap, "Block copolymers- Their microdomain formation (in solid state) and surfactant behaviour (in solution)", Current Science, vol. 80, No. 8, pp. 1002-1007, Apr. 25, 2001.
Batzilla, Thomas et al., "Formation of intra- and intermolecular crosslinks in the radical crosslinking of poly(4-vinylstyrene)", Makromol. Chem., Rapid Commun. 8, pp. 261-268 (1987).
Bauer, B.J. et al., "Synthesis and Dilute-Solution Behavior of Model Star-Branched Polymers", Rubber Chemistry and Technology, vol. 51, pp. 406-436 (1978).
Berger, G. et al., "Mutual Termination of Anionic and Cationic 'Living' Polymers", Polymer Letters, vol. 4, pp. 183-186 (1966).
Bohm, Georg et al., "Emerging materials: technology for new tires and other rubber products", Tire Technology International, 2006 (4 pp.).
Borukhov, Itamar et al., "Enthalpic Stabilization of Brush-Coated Particles in a Polymer Melt", Macromolecules, vol. 35, pp. 5171-5182 (2002).
Bradley, John S., "The Chemistry of Transition Metal Colloids", Clusters and Colloids: From Theory to Applications, Chapter 6, Weinheim, VCH, pp. 459-544 (1994).
Braun, Hartmut et al., "Enthalpic interaction of diblock copolymers with immiscible polymer blend components", Polymer Bulletin, vol. 32, pp. 241-248 (1994).
Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).
Brown, H.R. et al., "Communications to the Editor: Enthalpy-Driven Swelling of a Polymer Brush", Macromolecules, vol. 23, pp. 3383-3385 (1990).
Cahn, John W., "Phase Separation by Spinodal Decomposition in Isotropic Systems", The Journal of Chemical Physics, vol. 42, No. 1, pp. 93-99 (Jan. 1, 1965).
Calderara, Frederic et al., "Synthesis of chromophore-labelled polystyrene/poly(ethylene oxide) diblock copolymers", Makromol. Chem., 194, pp. 1411-1420 (1993).
Canham et al., "Formation of Worm-like Micelles from a Polystyrene-Polybutadiene-Polystyrene Block Copolymer in Ethyl Acetate", J.C.S. Faraday I, 76, pp. 1857-1867 (1980).
Chen, Ming-Qing et al., "Graft Copolymers Having Hydrophobic Backbone and Hydrophilic Branches. XXIII. Particle Size Control of Poly(ethylene glycol)- Coated Polystyrene Nanoparticles Prepared by Macromonomer Method", Journal of Polymer Science: Part A: Polymer Chemistry, vol. 37, pp. 2155-2166 (1999).
Chen, Wei et al., "Ultrahydrophobic and Ultrayophobic Surfaces: Some Comments and Examples", The ACS Journal of Surfaces and Colloids, vol. 15, No. 10, pp. 3395-3399 (May 11, 1999).
Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).
Coleman, Lester E. et al., "Reaction of Primary Aliphatic Amines with Maleic Anhydride", J. Org,. Chem., 24, 185, pp. 135-136 (1959).
Cosgrove, T. et al., Macromolecules, 26, pp. 4363-4367 (1993).
Coulson, S.R. et al., "Super-Repellent Composite Fluoropolymer Surfaces", The Journal of Physical Chemistry B, vol. 104, No. 37, pp. 8836-8840 (Sep. 21, 2000).
Dieterich, W. et al., "Non-Debye Relaxations in Disordered Ionic Solids", Chem. Chys., 284, pp. 439-467 (2002).
Edmonds, William F. et al., "Disk Micelles from Nonionic Coil- Coil Diblock Copolymers", Macromolecules, vol. 39, pp. 4526-4530 (May 28, 2006).
Ege, Seyhan, Organic Chemistry Structure and Reactivity, 3rd Edition, p. 959 (1994).
Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erbil, H. Yildirim et al., "Transformation of a Simple Plastic into a Superhydrophobic Surface", Science, vol. 299, pp. 1377-1380 (Feb. 28, 2003).

Erhardt, Rainer et al., Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Ferreira, Paula G. et al., "Scaling Law for Entropic Effects at Interfaces between Grafted Layers and Polymer Melts", Macromolecules, vol. 31, pp. 3994-4003 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Gay, C., "Wetting of a Polymer Brush by a Chemically Identical Polymer Melt", Macromolecules, vol. 30, pp. 5939-5943 (1997).

Gilman, J.W. et al., "Recent Advances in Flame Retardant Polymer Nanocomposites", pp. 273-283.

Giannelis, E.P. "Polymer Layered Silicate Nanocomposites", Advanced Materials, vol. 8, No. 1, pp. 29-35 (Jan. 1, 1996).

Greenwood, N.N. et al., "Chemistry of the Elements", Pergaroen Press, New York, pp. 1126-1127 (1984).

Guo, Andrew et al., "Star Polymers and Nanospheres from Cross-Linkable Diblock Copolymers", Macromolecules, vol. 29, pp. 2487-2493, Jan. 17, 1996.

Halperin, A., "Polymeric Micelles: A Star Model", Macromolecules, vol. 20, pp. 2943-2946 (1987).

Hamley, Ian W., "The Physics of Block Copolymers", Oxford Science Publication: Oxford, Chapters 3 and 4, pp. 131-265, (1998).

Hardacre, C. et al., "Structure of molten 1,3-dimethylimidazolium chloride using neutron diffraction", J. Chem. Physics, 118(1), pp. 273-278 (2003).

Hasegawa, Ryuichi et al., "Optimum Graft Density for Dispersing Particles in Polymer Melts", Macromolecules, vol. 29, pp. 6656-6662 (1996).

Hay, J.N. et al., "A Review of Nanocomposites" (2000).

Hoffman, B. et al., "Rheology of Nanocomposites Based on Layered Silicates and Polyamide-12", Colloid Polm. Sci.., 278, pp. 629-636 (2000).

Ishizu, Koji et al., "Synthesis of Star Polymer with Nucleus of Microgel", Polymer Journal, vol. 12, No. 6, pp. 399-404 (1980).

Ishizu, Koji et al., "Core-Shell Type Polymer Microspheres Prepared from Block Copolymers", Journal of Polymer Science: Part C: Polymer Letters, vol. 26, pp. 281-286 (1988).

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

Ishizu, Koji et al., "Preparation of core-shell type polymer microspheres from anionic block copolymers", Polymer, vol. 34, No. 18, pp. 3929-3933 (1993).

Ishizu, Koji, "Synthesis and Structural Ordering of Core-Shell Polymer Microspheres", Prog. Polym. Sci., vol. 23, pp. 1383-1408 (1998).

Ishizu, Koji, "Star Polymers by Immobilizing Functional Block Copolymers", Star and Hyperbranched Polymers, ISBN 0-8247, pp. 1986-1987 (1999).

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).

Jensen, M. et al., "EXAFS Investigations of the Mechanism of Facilitated Ion Transfer into a Room-Temperature Ionic Liquid", Jacs, 124, pp. 10664-10665 (2002).

Kim, Woo-Sik et al., "Synthesis and Photocrosslinking of Maleimide-Type Polymers", Macromol. Rapid Commun., 17, 835, pp. 835-841 (1996).

Kraus, Gerard, "Mechanical Losses in Carbon-Black-Filled Rubbers", Journal of Applied Polymer Science: Applied Polymer Symposium, vol. 39, pp. 75-92 (1984).

Krishnamoorti, R. et al., "Rheology of End-Tethered Polymer Layered Silicate Nanocomposites", Macromol., 30, pp. 4097-4102 (1997).

Lagaly, Gehard, "Kink-Block and Gauche-Block Structures of Bimolecular Films", Chem. Int. Ed. Engl., vol. 15, No. 10, pp. 575-586 (1976).

Lawson, David F. et al., "Preparation and Characterization of Heterophase Blends of Polycaprolactam and Hydrogenated Polydienes", Central Research Journal of Applied Polymer Science, vol. 39, pp. 2331-2351 (1990).

Lee, Wen-Fu et al., "Polysulfobetaines and Corresponding Cationic Polymers. IV. Synthesis and Aqueous Solution Properties of Cationic Poly (MIQSDMAPM)", J. Appl. Pol. Sci., vol. 59, pp. 599-608 (1996).

Ligoure, Christian, "Adhesion between a Polymer Brush and an Elastomer: A Self-Consistent Mean Field Model", Macromolecules, vol. 29, pp. 5459-5468 (1996).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).

Ma, H. et al., "Reverse Atom Transfer Radical Polymerization of Methyl Methacrylate in Room-Temperature Inoic Liqquids", J. Polym. Sci., A. Polym. Chem., 41, pp. 143-151 (2003).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Mandema et al., "Association of Block Copolymers in Selective Solvents, 1 Measurements on Hydrogenated Poly(styrene-isoprene) in Decane and in trans-Decalin", Makromol. Chem. 180, pp. 1521-1538 (1979).

Matsen, M.W., "Phase Behavior of Block Copolymer/Homopolymer Blends", Macromolecules, vol. 28, pp. 5765-5773 (1995).

Matsumoto, A. et al., "Synthesis, Thermal Properties and Gas Permeability of Poly (N-n-alkylmaleimide)s", Polymer Journal, vol. 23, No. 3, pp. 201-209 (1991).

Mayer, A.B.R. et al., "Transition metal nanoparticles protected by amphiphilic block copolymers as tailored catalyst systems", Colloid Polym. Sci., 275, pp. 333-340 (1997).

Mendizabal, E. et al., "Functionalized Core-Shell Polymers Prepared by Microemulsion Polymerization", ANTEC 1997 Plastics: Plastics Saving Planet Earth, vol. 2: Materials Conference Proceedings, pp. 1733-1737.

Mi, Yongli et al., "Glass transition of nano-sized single chain globules", Polymer 43, Elsevier Science Ltd., pp. 6701-6705 (2002).

Milner, S.T. et al., "Theory of the Grafted Polymer Brush", Macromolecules, vol. 21, pp. 2610-2619 (1988).

Milner, S.T. et al., "End-Confined Polymers: Corrections to the Newtonian Limit", Macromolecules, vol. 22, pp. 489-490 (1989).

Moller, M. et al., Macromol. Symp., 117, pp. 207-218 (1997).

Mossmer, S. et al., Macromol. 33, pp. 4791-4798 (2000).

Nace, Vaughn M., "Nonionic Surfactants: Polyoxyalkylene Block Copolymers", Surfactant Science Series, vol. 60, pp. 1-266 (1996).

Newkome G.R, "Dendrimers and Dendrons, Concept, Synthesis, Application", pp. 45, 191-310 (2001).

Noolandi, Jaan et al., "Theory of Block Copolymer Micelles in Solution", Macromolecules, vol. 16, pp. 1443-1448 (1983).

O'Reilly, Rachel K. et al., "Functionalization of Micelles and Shell Cross-linked Nanoparticles Using Click Chemistry", Chem. Mater., vol. 17, No. 24, pp. 5976-5988 [Nov. 24, 2005].

O'Reilly, Rachel K. et al., "Cross-linked block copolymer micelles: functional nanostructures of great potential and versatility", Chem. Soc. Rev., vol. 35, pp. 1068-1083 (Oct. 2, 2006).

Okay, Oguz et al., "Steric stabilization of reactive microgels from 1,4-divinylbenzene", Makromol. Chem., Rapid Commun., vol. 11, pp. 583-587 (1990).

Okay, Oguz et al., "Anionic Dispersion Polymerization of 1,4-Divinylbenzene", Macromolecules, 23, pp. 2623-2628 (1990).

Oranli, Levent et al., "Hydrodynamic studies on micellar solutions of styrene-butadiene block copolymers in selective solvents", Can. J. Chem., vol. 63, pp. 2691-2696, 1985.

Piirma, Irja, "Polymeric Surfactants", Surfactant Science Series, vol. 42, pp. 1-289 (1992).

Pispas, S. et al., "Effect of Architecture on the Micellization Properties of Block Copolymers: $A_2B$ Miktoarm Stars vs AB Diblocks", Macromolecules, vol. 33, pp. 1741-1746, Feb. 17, 2000.

Price, Colin, "Colloidal Properties of Block Copolymers", Applied Science Publishers Ltd., Chapter 2, pp. 39-80 (1982).

Quirk, R.P. et al., Macromolecules, 34, pp. 1192-1197 (2001).

Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).

Rein, David H. et al., "Kinetics of arm-first star polymers formation in a non-polar solvent", Macromol. Chem. Phys., vol. 199, pp. 569-574 (1998).

Rempp, Paul et al., "Grafting and Branching of Polymers", Pure Appl. Chem., vol. 30, pp. 229-238 (1972).

Ren, J., "Linear Viscoelasticity of Disordered Polystyrene-Polyisoprene . . . Layered-Silicate Nanocomposites", Macromol., pp. 3739-3746 (2000).

Riess, Gerard et al., "Block Copolymers", Encyclopedia of Polymer Science and Engineering, vol. 2, pp. 324-434 (1985).

Riess, Gerard, "Micellization of block copolymers", Prog. Polym. Sci., vol. 28, pp. 1107-1170 (Jan. 16, 2003).

Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159 (1991).

Saito, Reiko et al., "Synthesis of microspheres with 'hairy-ball' structures from poly (styrene-b-2-vinyl pyridine) diblock copolymers", Polymer, vol. 33, No. 5, pp. 1073-1077 (1992).

Saito, Reiko et al., "Arm-number effect of core-shell type polymer microsphere: 1. Control of arm-number of microsphere", Polymer, vol. 35, No. 4, pp. 866-871 (1994).

Saito, Reiko et al., "Synthesis of Microspheres with Microphase-Separated Shells", Journal of Polymer Science: Part A: Polymer Chemistry, vol. 38, pp. 2091-2097 (2000).

Semenov, A.N., "Theory of Diblock-Copolymer Segregation to the Interface and Free Surface of a Homopolymer Layer", Macromolecules, vol. 25, pp. 4967-4977 (1992).

Semenov, A.N., "Phase Equilibria in Block Copolymer-Homopolymer Mixtures", Macromolecules, vol. 26, pp. 2273-2281 (1993).

Serizawa, Takeshi et al., "Transmission Electron Microscopic Study of Cross-Sectional Morphologies of Core-Corona Polymeric Nanospheres", Macromolecules, 33, pp. 1759-1764 (2000).

Shull, Kenneth R., "End-Adsorbed Polymer Brushes in High- and Low-Molecular-Weight Matrices", Macromolecules, vol. 29, pp. 2659-2666 (1996).

Simmons, Blake et al., "Templating Nanostructure trhough the Self-Assembly of Surfactants", Synthesis, Functionalization and Surface Treatment of Nanoparticles, ASP (Am.Sci.Pub.), pp. 51-52, 174-208 (2003).

Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).

Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).

Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).

Thurmond, K. Bruce et al., "Shell cross-linked polymer micelles: stabilized assemblies with great versatility and potential", Colloids and Surfaces B: Biointerfaces, vol. 16, pp. 45-54 (1999).

Tiyapiboonchaiya, C. et la., "Polymer-m-Ionic-Liquid Electrolytes", Micromol. Chem. Phys., 203, pp. 1906-1911 (2002).

Tomalia, Donald A. et al., Dendritic Macromolecules: Synthesis of Starburst Dendrimers, , Macromolecules, vol. 19, No. 9, pp. 2466-2468 (1986).

Tsitsilianis, Constantinos et al., Makromol. Chem. 191, pp. 2319-2328 (1990).

Tuzar et al ., "Anomalous Behaviour of Solutions of Styrene-Butadiene Block Copolymers in Some Solvents", Makromol. Chem. 178, pp. 22743-22746, (1977).

Tuzar, Zdenek et al., "Micelles of Block and Graft Copolymers in Solutions", Surface and Colloid Science, vol. 15, Chapter 1, pp. 1-83 (1993).

Utiyama et al., "Light-Scattering Studies of a Polystyrene-Poly(methyl methacrylate) Two-Blcok Copolymer in Mixed Solvents", Macromolecules, vol. 7, No. 4, (Jul.-Aug. 1974).

Vamvakaki, M. et al., "Synthesis of novel block and statistical methacrylate-based ionomers containing acidic, basic or betaine residues", Polymer, vol. 39, No. 11, pp. 2331-2337 (1998).

van der Maarel, J.R.C. et al., "Salt-Induced Contraction of Polyelectrolyte Diblock Copolymer Micelles", Langmuir, vol. 16, No. 19, pp. 7510-7519 (2000).

Vermeesch, I. et al., "Chemical Modification of Poly (styrene-co-maleic anhydride) with Primary N-Alkylamines by Reactive Extrusion", J. Applied Polym. Sci., vol. 53, pp. 1365-1373 (1994).

Wang, Xiaorong et al., "Chain conformation in two-dimensional dense state", Journal of Chemical Physics, vol. 121, No. 16, pp. 8158-8162 (Oct. 22, 2004).

Wang, Xiaorong et al., "Strain-induced nonlinearity of filled rubbers", Physical Review E 72, 031406, pp. 1-9 (Sep. 20, 2005).

Pre-print article, Wang, Xiaorong et al., "PMSE 392- Manufacture and Commercial Uses of Polymeric Nanoparticles", Division of Polymeric Materials: Science and Engineering (Mar. 2006).

Wang, Xiaorong et al., "Manufacture and Commercial Uses of Polymeric Nanoparticles", Polymeric Materials: Science and Engineering, vol. 94, p. 659 (2006).

Wang, Xr. et al., "Fluctuations and critical phenomena of a filled elastomer under deformation", Europhysics Letters, vol. 75, No. 4, pp. 590-596 (Aug. 15, 2006).

Webber, Stephen E. et al., "Solvents and Self-Organization of Polymers", NATO ASI Series, Series E: Applied Sciences, vol. 327, pp. 1-509 (1996).

Whitmore, Mark Douglas et al., "Theory of Micelle Formation in Block Copolymer-Homopolymer Blends", Macromolecules, vol. 18, pp. 657-665 (1985).

Wijmans, C.M. et al., "Effect of Free Polymer on the Structure of a Polymer Brush and Interaction between Two Polymer Brushes", Macromolecules, vol. 27, pp. 3238-3248 (1994).

Wilkes, J.S. et al., "Dialkylimidazolium Chloroaluminate Melts: A New Class of Room-Temperature Ionic Liquids for Electrochemistry, Spectroscopy, and Synthesis", Inorg. Chem., 21, pp. 1263-1264 (1982).

Wilson, D.J. et al., "Photochemical Stabilization of Block Copolymer Micelles", Eur. Polym. J., vol. 24, No. 7, pp. 617-621, 1988.

Witten, T.A. et al., "Stress Relaxation in the Lamellar Copolymer Mesophase", Macromolecules, vol. 23, pp. 824-829 (1990).

Wooley, Karen L, "From Dendrimers to Knedel-like Structures", Chem. Eur. J., 3, No. 9, pp. 1397-1399 (1997).

Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).

Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).

Worsfold, D.J., "Anionic Copolymerization of Styrene with p-Divinylbenzene", Macromolecules, vol. 3, No. 5, pp. 514-517 (Sep.-Oct. 1970).

Zheng, Lei et al., "Polystyrene Nanoparticles with Anionically Polymerized Polybutadiene Brushes", Macromolecules, 37, pp. 9954-9962 (2004).

Zilliox, Jean-Georges et al., "Preparation de Macromolecules a Structure en Etoile, par Copolymerisation Anionique", J. Polymer Sci.: Part C, No. 22, pp. 145-156 (1968).

Bridgestone Americas 2006 Presentation (14 pp.).

"Quaternary Ammonium Compounds", Encyclopedia of Chem Tech., 4th Ed., vol. 20, pp. 739-767 (1996).

"Simultaneous TA and MS Analysis of Alternating Styrene-Malei Anhydride and Styrene-Maleimide Copolymers", Thermochim. Acta, 277, 14 (1996).

Vulcanization Agents and Auxiliary Materials, Kirk-Othmer, Encyclopedia of Chemical Technology, 3rd Ed., Wiley Interscience, NY, 1982, vol. 22, pp. 390-403.

Oct. 20, 2005 Office Action from U.S. Appl. No. 11/104,759, filed Apr. 13, 2005 (12 pp.).

Aug. 21, 2006 Final Office Action from U.S. Appl. No. 11/104,759, filed Apr. 13, 2005 (14 pp.).

Dec. 22, 2006 Advisory Action from U.S. Appl. No. 11/104,759, filed Apr. 13, 2005 (3 pp.).

May 16, 2007 Office Action from U.S. Appl. No. 11/104,759, filed Apr. 13, 2005 (9 pp.).

Oct. 30, 2007 Final Office Action from U.S. Appl. No. 11/104,759, filed Apr. 13, 2005 (11 pp.).

Wang, Xiaorong et al., U.S. Appl. No. 10/791,049, filed Mar. 2, 2004 entitled "Method Of Making Nano-Particles Of Selected Size Distribution".

Wang, Xiaorong et al., U.S. Appl. No. 10/791,177, filed Mar. 2, 2004 entitled "Rubber Composition Containing Functionalized Polymer Nanoparticles".

Wang, Xiaorong et al., U.S. Appl. No. 10/872,731, filed Jun. 21, 2004 entitled "Reversible Polymer/Metal Nano-Composites And Method For Manufacturing Same".

Wang, Xiaorong et al., U.S. Appl. No. 10/886,283, filed Jul. 6, 2004 entitled "Hydropobic Surfaces with Nanoparticles".

Wang, Xiaorong et al., U.S. Appl. No. 11/058,156, filed Feb. 15, 2005 entitled "Multi-Layer Nano-Particle Preparation And Applications".

Wang, Xiaorong et al., U.S. Appl. No. 11/104,759, filed Apr. 13, 2005 entitled "Nano-Particle Preparation And Applications".

Bohm, Georg G.A. et al., U.S. Appl. No. 11/117,981, filed Apr. 29, 2005 entitled "Self Assembly Of Molecules To Form Nano-Particle".

Wang, Xiaorong et al., U.S. Appl. No. 11/305,279, filed Dec. 16, 2005 entitled "Combined Use Of Liquid Polymer And Polymeric Nanoparticles For Rubber Applications".

Wang, Xiaorong et al., U.S. Appl. No. 11/344,861, filed Feb. 1, 2006 entitled "Nano-Composite And Compositions Therefrom".

Wang, Xiaorong et al., U.S. Appl. No. 11/642,796, filed Dec. 20, 2006 entitled "Hollow Nano-Particles And Method Thereof".

Wang, Xiaorong et al., U.S. Appl. No. 11/764,607, filed Jun. 18, 2007 entitled "Multi-Layer Nano-Particle Preparation and Applications".

Warren, Sandra, U.S. Appl. No. 11/771,659, filed Jun. 29, 2007 entitled "One-Pot Synthesis Of Nanoparticles And Liquid Polymer For Rubber Applications".

Wang, Xiaorong et al., U.S. Appl. No. 11/941,128, filed Nov. 16, 2007 entitled "Nano-Particle Preparation And Applications".

Wang, Xiaorong et al., U.S. Appl. No. 11/954,268, filed Dec. 12, 2007 entitled "Nanoporous Polymeric Material And Preparation Method".

Wang, Xiaorong et al., U.S. Appl. No. 12/047,896, filed Mar. 13, 2008 entitled "Reversible Polymer/Metal Nano-Composites And Method For Manufacturing Same".

Wang, Xiaorong et al., U.S. Appl. No. 12/184,895, filed Aug. 1, 2008 entitled "Disk-Like Nanoparticles".

Cui, Honggang et al., "Block Copolymer Assembly via Kinetic Control", Science, vol. 317, pp. 647-650 (Aug. 3, 2007).

Wang, Xiaorong et al., "Synthesis, Characterization, and Application of Novel Polymeric Nanoparticles", Macromolecules, 40, pp. 499-508 (2007).

Wang, Xiaorong et al., "Under microscopes the poly(styrene/butadiene) nanoparticles", Journal of Electron Microscopy, vol. 56, No. 6, pp. 209-216 (2007).

Wang, Xiaorong et al., "Heterogeneity of structural relaxation in a particle-suspension system", EPL, 79, 18001, pp. 1-5 (Jul. 2007).

Sakurai, Ryo et al., "68.2: Color and Flexible Electronic Paper Display using QR-LPD Technology", SID 06 Digest, pp. 1922-1925 (2006).

Asinovsky, Olga, Jun. 20, 2006 Office Action from U.S. Appl. No. 10/791,049, filed Mar. 2, 2004 (11 pp.).

Asinovsky, Olga, Dec. 22, 2006 Office Action from U.S. Appl. No. 10/791,049, filed Mar. 2, 2004 (11 pp.).

Asinovsky, Olga, Jun. 7, 2007 Office Action from U.S. Appl. No. 10/791,049, filed Mar. 2, 2004 (11 pp.).

Asinovsky, Olga, Nov. 28, 2007 Office Action from U.S. Appl. No. 10/791,049, filed Mar. 2, 2004 (9 pp.).

Asinovsky, Olga, May 21, 2008 Office Action from U.S. Appl. No. 10/791,049, filed Mar. 2, 2004 (11 pp.).

Asinovsky, Olga, Sep. 11, 2008 Office Action from U.S. Appl. No. 10/791,049, filed Mar. 2, 2004 (12 pp.).

Ronesi, Vickey M., Jan. 8, 2007 Office Action from U.S. Appl. No. 10/791,177, filed Mar. 2, 2004 (5 pp.).

Harlan, Robert D., May 3, 2007 Office Action from U.S. Appl. No. 10/791,177, filed Mar. 2, 2004 (6 pp.).

Harlan, Robert D., Oct. 18, 2007 Office Action from U.S. Appl. No. 10/791,177, filed Mar. 2, 2004 (6 pp.).

Harlan, Robert D., May 28, 2008 Office Action from U.S. Appl. No. 10/791,177, filed Mar. 2, 2004 (8 pp.).

Kiliman, Leszek B., Sep. 9, 2005 Office Action from U.S. Appl. No. 10/817,995, filed Apr. 5, 2004 (7 pp.).

Kiliman, Leszek B., Mar. 23, 2006 Office Action from U.S. Appl. No. 10/817,995, filed Apr. 5, 2004 (7 pp.).

Kiliman, Leszek B., Dec. 13, 2006 Office Action from U.S. Appl. No. 10/817,995, filed Apr. 5, 2004 (6 pp.).

Kiliman, Leszek B., Sep. 5, 2008 Office Action from U.S. Appl. No. 10/817,995, filed Apr. 5, 2004 (5 pp.).

Wyrozebski Lee, Katarzyna I., Dec. 19, 2006 Office Action from U.S. Appl. No. 10/872,731, filed Jun. 21, 2004 (6 pp.).

Wyrozebski Lee, Katarzyna I., Mar. 7, 2007 Office Action from U.S. Appl. No. 10/872,731, filed Jun. 21, 2004 (13 pp.).

Wyrozebski Lee, Katarzyna I., Sep. 14, 2007 Office Action from U.S. Appl. No. 10/872,731, filed Jun. 21, 2004 (9 pp.).

Chevalier, Alicia Ann, Sep. 6, 2006 Office Action from U.S. Appl. No. 10/886,283, filed Jul. 6, 2004 (5 pp.).

Chevalier, Alicia Ann, Jan. 4, 2007 Office Action from U.S. Appl. No. 10/886,283, filed Jul. 6, 2004 (8 pp.).

Chevalier, Alicia Ann, Jul. 2, 2007 Office Action from U.S. Appl. No. 10/886,283, filed Jul. 6, 2004 (8 pp.).

Chevalier, Alicia Ann, Jan. 4, 2008 Office Action from U.S. Appl. No. 10/886,283, filed Jul. 6, 2004 (8 pp.).

Mullis, Jeffrey C., Oct. 31, 2006 Office Action from U.S. Appl. No. 11/050,115, filed Feb. 3, 2005 (6 pp.).

Mullis, Jeffrey C., Mar. 24, 2008 Office Action from U.S. Appl. No. 11/050,115, filed Feb. 3, 2005 (10 pp.).

Mullis, Jeffrey C., Aug. 21, 2008 Office Action from U.S. Appl. No. 11/050,115, filed Feb. 3, 2005 (7 pp.).

Lipman, Bernard., Sep. 29, 2006 Office Action from U.S. Appl. No. 11/058,156, filed Feb. 15, 2005 (5 pp.).

Raza, Saira B., Oct. 20, 2005 Office Action from U.S. Appl. No. 11/104,759, filed Apr. 13, 2005 (10 pp.).

Raza, Saira B., Aug. 21, 2006 Office Action from U.S. Appl. No. 11/104,759, filed Apr. 13, 2005 (6 pp.).

Haider, Saira Bano, May 16, 2007 Office Action from U.S. Appl. No. 11/104,759, filed Apr. 13, 2005 (9 pp.).

Haider, Saira Bano, Oct. 30, 2007 Office Action from U.S. Appl. No. 11/104,759, filed Apr. 13, 2005 (9 pp.).

Haider, Saira Bano, Jun. 12, 2008 Office Action from U.S. Appl. No. 11/104,759, filed Apr. 13, 2005 (10 pp.).

Harlan, Robert D., Nov. 7, 2005 Office Action from U.S. Appl. No. 11/117,981, filed Apr. 29, 2005 (7 pp.).

Harlan, Robert D., Jul. 20, 2006 Office Action from U.S. Appl. No. 11/117,981, filed Apr. 29, 2005 (6 pp.).

Harlan, Robert D., Jan. 26, 2007 Office Action from U.S. Appl. No. 11/117,981, filed Apr. 29, 2005 (8 pp.).

Harlan, Robert D., Jul. 12, 2007 Office Action from U.S. Appl. No. 11/117,981, filed Apr. 29, 2005 (6 pp.).

Harlan, Robert D., Jan. 2, 2008 Office Action from U.S. Appl. No. 11/117,981, filed Apr. 29, 2005 (6 pp.).

Harlan, Robert D., Jul. 25, 2008 Office Action from U.S. Appl. No. 11/117,981, filed Apr. 29, 2005 (8 pp.).

Maksymonko, John M., Feb. 20, 2008 Office Action from U.S. Appl. No. 11/305,279, filed Dec. 16, 2005 (14 pp.).

Maksymonko, John M., Aug. 6, 2008 Office Action from U.S. Appl. No. 11/305,279, filed Dec. 16, 2005 (11 pp.).

Maksymonko, John M., Jul. 17, 2008 Office Action from U.S. Appl. No. 11/305,281, filed Dec. 16, 2005 (13 pp.).
Le, Hoa T., Sep. 25, 2008 Office Action from U.S. Appl. No. 11/612,554, filed Dec. 19, 2006 (8 pp.).
Maksymonko, John M., Jun. 13, 2008 Office Action from U.S. Appl. No. 11/641,514, filed Dec. 19, 2006 (7 pp.).
Mullis, Jeffrey C., Oct. 31, 2008 Office Action from U.S. Appl. No. 11/641,514, filed Dec. 19, 2006 (10 pp.).
Maksymonko, John M., May 30, 2008 Office Action from U.S. Appl. No. 11/642,795, filed Dec. 20, 2006 (12 pp.).
Maksymonko, John M., May 28, 2008 Office Action from U.S. Appl. No. 11/642,802, filed Dec. 20, 2006 (10 pp.).
Chen, Jizhuang, Dec. 30, 2005 Office Action from Chinese Patent Application No. 02819527.2 filed Oct. 4, 2002 (9 pp.).
Chen, Jizhuang, Dec. 21, 2007 Office Action from Chinese Patent Application No. 02819527.2 filed Oct. 4, 2002 (12 pp.).
Chen, Jizhuang, Sep. 26, 2008 Office Action from Chinese Patent Application No. 02819527.2 filed Oct. 4, 2002 (4 pp.).
Schutte, M., Aug. 8, 2006 Office Action from European Patent Application No. 02807196.7 filed Oct. 4, 2002 (5 pp.).
Schutte, Maya, Sep. 3, 2007 Office Action from European Patent Application No. 02807196.7 filed Oct. 4, 2002 (2 pp.).
Watanabe, Y., May 7, 2008 Office Action from Japanese Patent Application No. 582224/2003 filed Oct. 4, 2002 (5 pp.).
Watanabe, Y., Jul. 29, 2008 Office Action from Japanese Patent Application No. 582224/2003 filed Oct. 4, 2002 (17 pp.).
May 30, 2008 International Search Report from PCT Patent Application No. PCT/US2007/026031 filed Dec. 19, 2007 (4 pp.).
May 27, 2008 International Search Report from PCT Patent Application No. PCT/US2007/087869 filed Dec. 18, 2007 (4 pp.).
Aug. 25, 2008 International Search Report from PCT Patent Application No. PCT/US2008/068838 filed Jun. 30, 2008 (4 pp.).
Lipman, Bernard, Mar. 26, 2002 Notice of Allowance from U.S. Appl. No. 09/970,830, filed Oct. 4, 2001 (4 pp.).
Kiliman, Leszek B., Feb. 13, 2003 Office from U.S. Appl. No. 10/038,748, filed Dec. 31, 2001 (3 pp.).
Kiliman, Leszak B., Aug. 25, 2003 Notice of Allowance from U.S. Appl. No. 10/038,748, filed Dec. 31, 2001 (5 pp.).
Harlan, Robert D., Mar. 17, 2004 Restriction/Election Office Action from U.S. Appl. No. 10/223,393, filed Aug. 19, 2002 (6 pp.).
Harlan, Robert D., Jun. 22, 2004 Office Action from U.S. Appl. No. 10/223,393, filed Aug. 19, 2002 (6 pp.).
Harlan, Robert D., Jan. 3, 2005 Notice of Allowance from U.S. Appl. No. 10/223,393, filed Aug. 19, 2002 (6 pp.).
Lipman, Bernard, Mar. 25, 2004 Restriction/Election Office Action from U.S. Appl. No. 10/331,841, filed Dec. 30, 2002 (6 pp.).
Lipman, Bernard, Nov. 18, 2004 Notice of Allowance from U.S. Appl. No. 10/331,841, filed Dec. 30, 2002 (5 pp.).
Lipman, Bernard, Mar. 24, 2004 Restriction/Election Office Action from U.S. Appl. No. 10/345,498, filed Jan. 16, 2003 (5 pp.).
Lipman, Bernard, Nov. 23, 2004 Notice of Allowance from U.S. Appl. No. 10/345,498, filed Jan. 16, 2003 (5 pp.).
Choi, Ling Siu, Mar. 24, 2006 Office Action from U.S. Appl. No. 10/755,648, filed Jan. 12, 2004 (11 pp.).
Choi, Ling Siu, Dec. 4, 2006 Notice of Allowance from U.S. Appl. No. 10/755,648, filed Jan. 12, 2004 (9 pp.).
Asinovsky, Olga, Aug. 16, 2007 Advisory Action from U.S. Appl. No. 10/791,049, filed Mar. 2, 2004 (2 pp.).
Asinovsky, Olga, Jul. 29, 2008 Advisory Action from U.S. Appl. No. 10/791,049, filed Mar. 2, 2004 (3 pp.).
Harlan, Robert D., Jan. 9, 2008 Advisory Action from U.S. Appl. No. 10/791,177, filed Mar. 2, 2004 (3 pp.).
Harlan, Robert D., Mar. 7, 2008 Advisory Action from U.S. Appl. No. 10/791,177, filed Mar. 2, 2004 (3 pp.).
Le, Hoa T., Dec. 14, 2004 Office Action from U.S. Appl. No. 10/791,491, filed Mar. 2, 2004 (5 pp.).
Le, Hoa T., Jul. 5, 2005 Office Action from U.S. Appl. No. 10/791,491, filed Mar. 2, 2004 (9 pp.).
Le, Hoa T., Apr. 10, 2006 Notice of Allowance from U.S. Appl. No. 10/791,491, filed Mar. 2, 2004 (5 pp.).
Kiliman, Leszak B., May 15, 2007 Advisory Action from U.S. Appl. No. 10/817,995, filed Apr. 5, 2004 (2 pp.).
Kiliman, Leszak B., Apr. 2, 2008 Notice of Allowance from U.S. Appl. No. 10/817,995, filed Apr. 5, 2004 (5 pp.).
Mullis, Jeffrey C., Nov. 5, 2008 Advisory Action from U.S. Appl. No. 11/050,115, filed Feb. 3, 2005 (4 pp.).
Lipman, Bernard, May 21, 2007 Notice of Allowance from U.S. Appl. No. 11/058,156, filed Feb. 15, 2005 (3 pp.).
Lipman, Bernard, Aug. 28, 2007 Notice of Allowance from U.S. Appl. No. 11/058,156, filed Feb. 15, 2005 (5 pp.).
Lipman, Bernard, Feb. 28, 2008 Notice of Allowance from U.S. Appl. No. 11/058,156, filed Feb. 15, 2005 (5 pp.).
Lipman, Bernard, May 29, 2008 Notice of Allowance from U.S. Appl. No. 11/058,156, filed Feb. 15, 2005 (5 pp.).
Lipman, Bernard, Oct. 3, 2006 Notice of Allowance from U.S. Appl. No. 11/064,234, filed Feb. 22, 2005 (5 pp.).
Haider, Saira Bano, Dec. 22, 2006 Advisory Action from U.S. Appl. No. 11/104,759, filed Apr. 13, 2005 (3 pp.).
Haider, Saira Bano, Mar. 19, 2008 Advisory Action from U.S. Appl. No. 11/104,759, filed Apr. 13, 2005 (3 pp.).
Haider, Saira Bano, Dec. 2, 2008 Office Action from U.S. Appl. No. 11/104,759, filed Apr. 13, 2005 (10 pp.).
Lipman, Bernard, Sep. 14, 2006 Office Action from U.S. Appl. No. 11/168,297, filed Jun. 29, 2005 (4 pp.).
Lipman, Bernard, Mar. 2, 2007 Notice of Allowance from U.S. Appl. No. 11/168,297, filed Jun. 29, 2005 (3 pp.).
Lipman, Bernard, Apr. 18, 2007 Supplemental Notice of Allowability from U.S. Appl. No. 11/168,297, filed Jun. 29, 2005 (3 pp.).
Lipman, Bernard, Mar. 20, 2008 Office Action from U.S. Appl. No. 11/764,607, filed Jun. 18, 2007 (4 pp.).
Lipman, Bernard, Sep. 25, 2008 Notice of Allowance from U.S. Appl. No. 11/764,607, filed Jun. 18, 2007 (3 pp.).
Russell, Graham, Nov. 4, 2008 Office Action from European Patent Application No. 05742316.2 filed Mar. 28, 2005 (2 pp.).
Schutte, M., Nov. 13, 2003 International Search Report from PCT Patent Application No. PCT/US02/31817 filed Oct. 4, 2002 (3 pp.).
Schutte, M., May 28, 2004 International Search Report from PCT Patent Application No. PCT/US03/40375 filed Dec. 18, 2003 (3 pp.).
Iraegui Retolaza, E., Jul. 9, 2004 International Search Report from PCT Patent Application No. PCT/US2004/001000 filed Jan. 15, 2004 (3 pp.).
Russell, G., Aug. 1, 2005 International Search Report from PCT Patent Application No. PCT/US2005/010352 filed Mar. 28, 2005 (3 pp.).
Mettler, Rolf-Martin, May 27, 2008 International Search Report from PCT Patent Application No. PCT/US2007/087869 filed Dec. 18, 2007 (2 pp.).
Iraegui Retolaza, E., May 30, 2008 International Search Report from PCT Patent Application No. PCT/US2007/026031 filed Dec. 19, 2007 (3 pp.).
Haider, Saira Bano, Mar. 3, 2009 Advisory Action from U.S. Appl. No. 11/104,759 (3 pp.).
Harlan, Robert D., Final Office Action dated Dec. 10, 2008 from U.S. Appl. No. 10/791,177 (8 pp.).
Cain, Edward J., Final Office Action dated Dec. 9, 2008 from U.S. Appl. No. 11/642,795 (6 pp.).
Mulcahy, Peter D., Restriction/Election Office Action dated Dec. 11, 2008 from U.S. Appl. No. 11/642,802 (7 pp.).
Lipman, Bernard, Notice of Allowance dated Jan. 27, 2009 from U.S. Appl. No. 11/764,607 (4 pp.).
Johnson, Edward M., International Search Report dated Dec. 12, 2008 from PCT Application No. PCT/US07/74611 (5 pp.).
Wang, Xiaorong et al., U.S. Appl. No. 12/374,883 international filing date Jul. 27, 2007, entitled "Polymeric Core-Shell Nanoparticles with Interphase Region".
Mullis, Jeffrey C., Mar. 11, 2009 Office Action from U.S. Appl. No. 10/791,049 (9 pp.).
Harlan, Robert D., Mar. 11, 2009 Notice of Allowance from U.S. Appl. No. 10/791,177 (8 pp.).
Sykes, Altrev C., Mar. 20, 2009 Office Action from U.S. Appl. No. 11/818,023 (27 pp.).
Pak, Hannah J., Apr. 2, 2009 Office Action from U.S. Appl. No. 11/941,128 (9 pp.).

* cited by examiner

*Making Nano Al(OH)$_3$ Particles*

NANO-SIZED INORGANIC METAL PARTICLES, PREPARATION THEREOF, AND APPLICATION THEREOF IN IMPROVING RUBBER PROPERTIES

This application claims the benefit of U.S. Provisional Application No. 60/751,788, Filed Dec. 20, 2005, which is incorporated herein by reference.

BACKGROUND OF THE INVENTION

The present invention is generally related to enophile functionalized polymer particles, nano-sized inorganic metal particles, and preparations of both. Also, the present invention is related to a novel rubber composition comprising nano-sized inorganic metal particles and a method of improving the properties of a rubber composition.

As a transition between atomic and bulk material, nano-sized material has new, surprising and important properties such as solubility, optical properties, electronic properties, magnetic properties, chemical reactivity, and chemical selectivity etc. The potential benefits of nano-sized material are pervasive, including information technology, medicine and health, material and manufacturing, aeronautics and space exploration, environmental and energy etc. Various prior arts have described the preparation, analysis, physics, and chemistry of nano-sized materials, for example, "Physics and Chemistry Of Metal Cluster Compounds" edited by L. J. De Jongh, Kluver Academic, Dordrecht/Boston/London, 1994, and references thereof. For nano-sized materials that are synthesized from polymer matrices, examples include clusters of zinc sulfide, lead sulfide and cadmium sulfide from polymethyltetracyclododecene (J. Am. Chem. Soc. 1993, 115, 4409-4410); inorganic crystallites or clusters of cadmium sulfide, cobalt sulfide, nickel sulfide and zinc sulfide from functionalized diblock copolymers of polystyrene and poly-2-vinylpyridine (Synthetic Metals, 1991, 41-43, 1159-1162); semiconductor particles from an ethylene-methacrylic acid copolymer (Inorganic Chemistry, 1988, 27(3), 435-436); lead sulfide clusters from ethylene-methacrylic acid copolymers (J. Chem. Phys., 1987 87(12), 7315-7322); cadmium sulfide in a Nafion polymer film (J. Phys. Chem., 1984, 88, 980-984); spherical cadmium sulfide particles with a diameter of one micrometer or smaller, from an ionically conductive polymer membrane (Nafion) (J. Am. Chem. Soc., 1983, 105, No. 23, 7002-7003); metal clusters that are less than 100 Angstroms in diameter from a nonconductive polymer matrix (Chem. Mater. 1992, 4, 885-894); $Cu^{2+}$ complexes formed with anionic polyamidoamine dendrimers (J. Am. Chem. Soc. 1994, 116, 661-671); and PAMAM-SBDs/Mn(II) complexes (J. Phys. Chem. 1996, 100, 11033-11042).

The exploration and exploitation of nano-sized inorganic metal particles, however, have not so far been adequately and satisfactorily carried out for industrial application purpose. Advantageously, the present invention provides a method of preparing nano-sized inorganic metal particles using enophile functionalized polymer particles as host. Equally advantageously, the present invention provides a method of improving the properties of a rubber composition, such as that used to construct tires by formulating nano-sized inorganic metal particles into the formulation, and thereby improving several properties, including bonding rubber, tensile strength, tear strength, and wet traction, among others.

BRIEF DESCRIPTION OF THE INVENTION

One aspect of the present invention is to provide enophile functionalized polymer particles.

Another aspect of the present invention is to provide nano-sized inorganic metal particles such as $Al(OH)_3$ particles.

A further aspect of the present invention is to provide a method of preparing enophile functionalized polymer particles.

A still further aspect of the present invention is to provide a method of preparing nano-sized inorganic metal particles in which enophile functionalized polymer particles can be used as intermediates.

One more aspect of the present invention is to provide a novel rubber composition, such as a tire product, which comprises nano-sized inorganic metal particles such as $Al(OH)_3$ particles.

A further aspect of the present invention is to provide a method of improving the properties of a rubber composition, such as a tire, the properties including bonding rubber, tensile strength, tear strength, and wet traction, among others. The method comprises formulating nano-sized inorganic metal particles into the rubber composition.

DETAILED DESCRIPTION OF THE INVENTION

Figure 1:
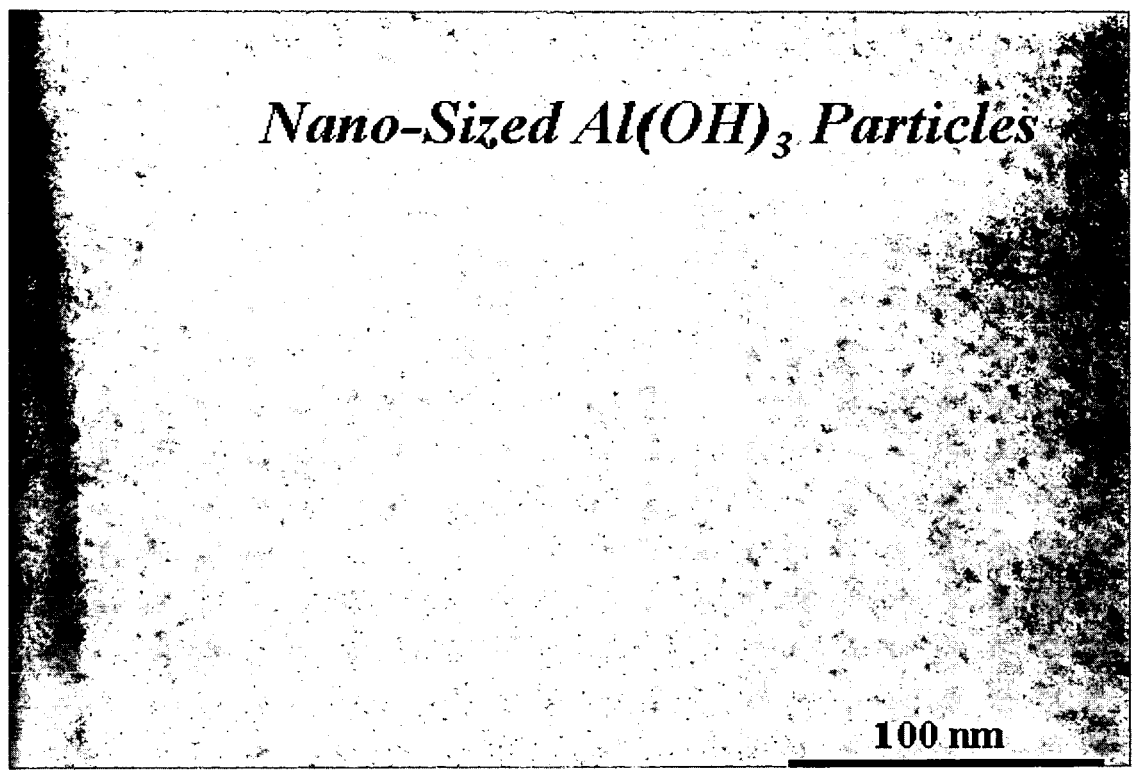
FIG. 1 is the transmission electron microscopy (TEM) image of nano-sized $Al(OH)_3$ crystals dispersed in azo carboxylate functionalized butadiene-t-butyl styrene copolymer nano-particles in accord with one aspect of the present invention.

It is to be understood herein, that if a "range" or "group" of substances or the like is mentioned with respect to a particular characteristic (e.g. temperature, size, time and the like) of the present invention, it relates to and explicitly incorporates herein each and every specific member and combination of sub-ranges or sub-groups therein whatsoever. Thus, any specified range or group is to be understood as a shorthand way of referring to each and every member of a range or group individually as well as each and every possible sub-range or sub-group encompassed therein; and similarly with respect to any sub-ranges or sub-groups therein.

The present invention is generally related to enophile functionalized polymer particles, nano-sized inorganic metal particles, and preparations of both, in which the former can be used as intermediates for the preparation of the latter. What is more, the present invention is also related to a method of improving the properties of a rubber composition, such as a tire, by formulating nano-sized inorganic metal particles such as $Al(OH)_3$ particles into the rubber composition, the improved properties including bonding rubber, tensile strength, tear strength, and wet traction, among others, and a novel rubber composition comprising nano-sized inorganic metal particles.

According to an embodiment of the invention, preparation of enophile functionalized polymer nano-particles may comprise the steps of:

forming block copolymer chains having at least a poly (conjugated diene) block and at least a poly(alkenyl arene) block;

assembling the block copolymer chains into micelles or polymer nano-particles;

optionally crosslinking the block copolymer with a multiple-alkenyl substituted arene monomer; and functionalizing the poly(conjugated diene) block of the polymer nano-particles with an enophile.

In various embodiments of the invention, the method of preparing nano-sized inorganic metal particles comprises:

forming block copolymer chains having at least a poly (conjugated diene) block and at least a poly(alkenyl arene) block;

assembling the block copolymer chains into micelles or polymer nano-particles;

optionally crosslinking the block copolymer with a multiple-alkenyl substituted arene monomer;

functionalizing the poly(conjugated diene) block of the polymer nano-particles with an enophile;

contacting the enophile functionalized poly(conjugated diene) block with an organic metallic compound;

distributing the organic metallic compound on or in the functionalized poly(conjugated diene) block;

converting the distributed organic metallic compound to nano-sized inorganic metal particles; and optionally isolating the nano-sized inorganic metal particles in a solvent in which the enophile functionalized polymer particles are sufficiently more soluble than the nano-sized inorganic metal particles.

In exemplary embodiments of the present invention, the enophile functionalized polymer nano-particle is used as a template or matrix for the formation of the nano-sized inorganic metal particles. Metals of the organic metallic compound may include, but are not limited to, Cu, Ti, Fe, Al, Cd, Ni, Pd, Sc, V, Cr, Mn, Co, Zn, Ga, Y, Zr, Nb, Mo, Tc, Ru, Rh, Ag, In, Sn, Sb, W, Re, Os, Ir, Pt, Au, Hg, Tl, Pb, Bi, and the like, and the mixture thereof. As such, the organic metallic compound may comprise metal alkoxide compounds, metal alkyl compounds, metal alkylenyl compounds, metal alkylnitride compounds, and other similar compounds known to the skilled artisan. In embodiments of the invention, the bond between the metal atom and the organic unit in the organic metallic compound should be sufficiently ionic that conversion of the organic metallic compound to nano-sized inorganic metal particles is kinetically and thermodynamically feasible. Said conversion reactions may include, but are not limited to, hydrolysis, sulfidizing methods, carbonation, oxidation, and other methods known to the skilled artisan.

According to the invention, various kinds of nano-sized inorganic metal particles may be prepared, such as hydroxides, oxides and sulfides of Cu, Ti, Fe, Al, Cd, Ni, Pd, Sc, V, Cr, Mn, Co, Zn, Ga, Y, Zr, Nb, Mo, Tc, Ru, Rh, Ag, In, Sn, Sb, W, Re, Os, Ir, Pt, Au, Hg, Tl, Pb, Bi, etc. and the mixture thereof.

As a representative example of the invention, the procedure of preparing nano-sized $Al(OH)_3$ particles, during which the enophile functionalized polymer particle is formed as an intermediate, comprises:

forming block copolymer chains having at least a poly (conjugated diene) block and at least a poly(alkenyl arene) block;

assembling the block copolymer chains into micelles or polymer nano-particles;

optionally crosslinking the block copolymer with a multiple-alkenyl substituted arene monomer;

functionalizing the poly(conjugated diene) block of the polymer nano-particles with an enophile;

contacting the enophile functionalized poly(conjugated diene) block with an aluminum alkoxide;

distributing aluminum ion on or in the functionalized poly (conjugated diene) block;

hydrolyzing the distributed aluminum ion with water to form the nano-sized $Al(OH)_3$ particles; and optionally isolating the $Al(OH)_3$ particles by disassociating them from the enophile functionalized polymer particles in a solvent.

In forming the block copolymer chains having at least a poly(conjugated diene) block and at least a poly(alkenyl arene) block and assembling them into a micelle, anionic polymerization and dispersion polymerization are preferred to be employed. Anionic polymerization and dispersion polymerization are well-known for a skilled person in the art. For example, U.S. Pat. Nos. 4,942,209, 4,829,135, 5,891,947, 5,847,054, and 5,763,551 have disclosed methods for dispersion polymerization, which are entirely incorporated herein as references.

As indicated supra, the block copolymer chain comprises at least a poly(conjugated diene) block and at least a poly (alkenyl arene) block. As a contributory factor in facilitating micelle formation from the block copolymer chains, the solubility difference in a selected dispersion solvent between the two blocks, should be sufficiently significant. For example, when a non-aromatic hydrocarbon solvent is selected as the dispersion solvent, conjugated diene monomers and polymer blocks thereof, will typically have adequately higher solubility than alkenyl arene monomers and polymer blocks thereof.

Generally, $C_4$-$C_8$ conjugated diene monomers are well suited for the present invention. Exemplary conjugated diene monomers include, but are not limited to, 1,3-butadiene, Isoprene (2-methyl-1,3-butadiene), 2-ethyl-1,3-butadiene, 2,3-dimethyl-1,3-butadiene, piperylene (1,3-pentadiene), 2-methyl-1,3-pentadiene, 3-methyl-1,3-pentadiene, 4-methyl-1,3-pentadiene, 2,4-dimethyl-1,3-pentadiene, 1,3-hexadiene, and the like. Suitable non-aromatic hydrocarbon solvents include aliphatic hydrocarbons, such as pentane, hexane, heptane, octane, nonane, decane, and the like, as well as cyclic hydrocarbons, such as cyclohexane, methyl cyclopentane, cyclooctane, cyclopentane, cycloheptane, cyclononane, cyclodecane and the like. These hydrocarbons may be used individually or in combination. In a specific embodiment of the present invention, hexane is first charged to a polymerization reactor, and then butadiene/hexane blend is charged.

According to the present invention, temperature control is also essential, as it is not only part of the reaction conditions for the polymerization per se, but also another contributory factor in facilitating micelle formation from the block copolymer chains. Therefore, the overall control of, and balance between, selection and quantity of for example monomers, selection and quantity of solvent, temperature, and reaction time, dictate the formation of micelles and ultimately the enophile-functionalized polymer nano-particles. The assembled micelles are preferably formed by maintaining a temperature that is also favorable to polymerization of the selected monomers in the selected solvent(s). Preferred temperatures are in the range of about −70 to 200° C., with a temperature in the range of about −10 to 150° C. being particularly preferred.

To the reaction mixture which includes conjugated diene and dispersion solvent and, preferably after the temperature of the reaction mixture is stabilized, an anionic initiator can be added to initiate the anionic polymerization, this may optionally be added together with a 1,2-microstructure controlling agent.

The anionic initiators selected for the dispersion polymerization of the present invention can be any known organolithium compounds. Preferred organolithium compounds are alkyl lithium, cycloalkyl lithium, cycloalkylalkyl lithium, alkylcycloalkyl lithium, alkenyl lithium, aryl lithium and alkylaryl lithium. Examples of the alkyl group in alkyl lithium include, but are not limited to, methyl, ethyl, n-propyl, isopropyl, n-butyl, isobutyl, t-butyl, n-amyl, isoamyl, n-hexyl, n-octyl, n-decyl, and the like. Examples of the cycloalkyl group in cycloalkyl lithium include, but are not limited to, cyclopentyl, cyclohexyl, 2,2,1-bicycloheptyl, and the like. Examples of the alkylcycloalkyl group in alkylcycloalkyl lithium include, but are not limited to, methylcyclopentyl, dimethylcyclopentyl, ethylcyclopentyl, methylcyclohexyl, dimethylcyclohexyl, ethylcyclohexyl, isopropylcyclohexyl, 4-butylcyclohexyl, and the like. Examples of the cycloalkylalkyl group in cycloalkylalkyl lithium include, but are not limited to, cyclopentyl-methyl, cyclohexyl-ethyl, cyclopentyl-ethyl, methyl-cyclopentylethyl, 4-cyclohexylbutyl, and the like. Examples of the alkenyl group in alkenyl lithium include, but are not limited to, vinyl, propenyl, and the like. Examples of the arylalkyl group in arylalkyl lithium include, but are not limited to, 4-phenylbutyl, benzyl, and the like. Examples of the aryl and alkylaryl in the lithium compounds include, but are not limited to, phenyl, naphthyl, 4-butylphenyl, p-tolyl, and the like.

The anionic initiator of the present invention is employed in amounts designed to result in the desired molecular weight of the block polymer. The ratio of millimoles of initiator per hundred grams of monomer for use in the present invention ranges between 0.1 millimoles to 100 millimoles, preferably 0.5 millimoles to 50 millimoles.

For a conjugated diene monomer such as 1,3-butadiene, either 1,2-addition or 1,4-addition can occur when it is subject to the polymerization reaction. As such, a 1,2-microstructure controlling agent is optionally used to control the 1,2-addition mechanism, and also, as a result, to control the final 1,2-microstructure content of the conjugated diene polymer blocks in the micelles and polymer nano-particles. The 1,2-microstructure controlling agents that can be used in the present invention include linear or cyclic oxolanyl oligomers. Suitable 1,2-microstructure controlling agents include, but are not limited to, bis(2-oxolanyl)methane; 1,1-bis(2-oxolanyl)ethane; bistetrahydrofuryl propane; 2,2-bis(2-oxolanyl) propane; 2,2-bis(5-methyl-2-oxolanyl)propane; 2,2-bis-(3,4,5-trimethyl-2-oxolanyl)propane; 2,5-bis(2-oxolanyl-2-propyl)oxolane; octamethylperhydrocyclotetrafurfurylene (cyclic tetramer); 2,2-bis(2-oxolanyl) butane; and the like. A mixture of two or more 1,2-microstructure controlling agents also can be used. The preferred 1,2-microstructure controlling agents for use in the present invention are oligomeric oxolanyl propanes (OOPs).

In one embodiment of the present invention, as the charge of 1,2-microstructure controlling agent increases, the percentage of 1,2-microstructure (vinyl content) increases in the poly(conjugated diene) block, which is situated at, for example, the surface region of the micelles or polymer nanoparticles. The ratio of the 1,2-microstructure controlling agent to the monomers can vary from a minimum as low as 0 to a maximum as great as about 30 millimoles, preferably about 0 to 10 millimoles, of 1,2-microstructure controlling agent per hundred grams of monomer being charged into the reactor. The vinyl content of the conjugated diene block is preferably between about 0% and 100%, and more preferably between about 7% and 70%.

Taking 1,3-butadiene as a representative example for the conjugated diene monomer, when the monomers are polymerized, possible 1,2-addition, cis and trans 1,4-addition mechanisms result in a final poly(conjugated diene) block in accord with the illustrative structure shown below.

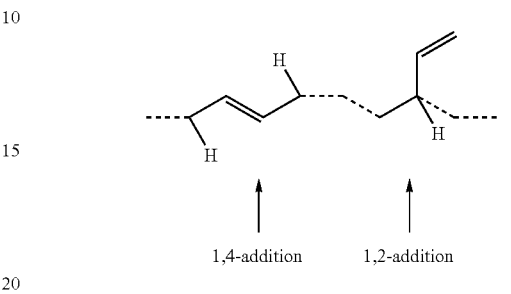

In the above structure of poly(1,3-butadiene), only trans 1,4-addition is shown for illustration purposes. However it should be understood that cis 1,4-addition is also within the present invention. It should also be noted that at least one allylic hydrogen (ene) is present in each contributing monomer. As will be more fully described herein below, these ene groups can be functionalized with enophile reagents.

Optionally, an antioxidant can be added to the reaction system during, for example, the polymerization of the conjugated diene monomer. Suitable antioxidants include, but are not limited to, butylated hydroxyl toluene (BHT) such as 2,6-ditertbutyl-4-methyl phenol or other stereochemically-hindered phenols, thioethers, and phospites etc.

In completing the formation of the block copolymer chains of the present invention, the poly(alkenyl arene) block is introduced into the chains. According to one embodiment of the invention, a diblock copolymer chain may be formed by anionic living polymerization, in which alkenyl arene monomers are added to a polymerized conjugated diene with an anionic living end. Another method of forming the block copolymer chain is anionic living copolymerization of a mixture of conjugated diene monomers and alkenyl arene monomers, particularly, in the absence of certain polar additives, such as ethers, tertiary amines, or metal alkoxides which could otherwise effect the polymerization of the separately constituted polymer blocks. Under these conditions, the conjugated diene generally polymerizes first, followed by the polymerization of the alkenyl arene. In either instances, the block copolymer contains a poly(conjugated diene) block, which is more soluble in a non-aromatic hydrocarbon dispersion solvent, and a poly(alkenyl arene) block, which is less soluble in the same dispersion solvent.

Exemplary alkenyl arene monomers include, but are not limited to, styrene, t-butyl styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted arenes, and mixtures thereof. In a specific embodiment of the present invention, the selected alkenyl arene is styrene or t-butyl styrene, and is added as a blend with hexane.

In forming the micelle from the block copolymer chains, an additional amount of dispersion solvent can be added to initiate the micelle assembling and/or to control the size or concentration of already-formed micelles.

Optionally, the poly(alkenyl arene) block can be further crosslinked with a multiple-alkenyl substituted arene monomer. According to the present invention, the micelle formed by the polymerization of the conjugated diene and alkenyl arene monomers is preferably crosslinked to enhance the uniformity and permanence of shape and size of the resultant polymer nano-particles. In a specific embodiment of the invention, after formation of the micelles, a cross-linking agent is added to the polymerization mixture. The cross-linking agent has at least two polymerizable groups such as vinyl which can be polymerized and result in a crosslinked polymer network. Preferably, a selected crosslinking agent has a stronger affinity to, or higher compatibility with, the alkenyl arene monomers and the poly(alkenyl arene) block, and therefore is able to migrate into them. The crosslinking agents can crosslink at least part of the micelles to form the desired polymer nano-particles of the present invention. In a specific embodiment, polymer nano-particles are formed from the micelles with a core including crosslinked poly(alkenyl arene) blocks and a surface layer including poly(conjugated diene) blocks. Typical crosslinking agents are di-alkenyl- or tri-alkenyl-substituted arene. A preferred crosslinking agent is divinylbenzene (DVB).

After an appropriate period of the anionic polymerization, the reaction can be terminated with a stopping agent such as an alcohol, for example, methanol, ethanol, isopropanol, butanol, and the like, and the mixture thereof. For example, the polymer nano-particle products can be dropped into isopropanol, and after precipitation, drum dried.

The polymer nano-particles of the present invention can be analyzed and characterized by routine measurements that are well-known to a skilled artisan, for example, NMR, GPC (with polystyrene/THF as standard), and etc. Without being bound by theory, it is believed that an exemplary micelle will be comprised of ten to five hundred block copolymers yielding, after crosslinking, a nano-particle having a number average molecular weight of between about 1,000 and 10,000,000, preferably between about 10,000 and 1,000,000, for example, around 900,000. The polymer nano-particles preferably have an average diameter less than about 100 nm, are substantially monodisperse and uniform in shape. The dispersity is represented by the ratio of $M_w$ to $M_n$, with a ratio of 1 being substantially monodisperse. The polydispersity of the molecular weight is preferably less than about 2.0, more preferably less than about 1.8, and most preferably less than about 1.5, for example, around 1.1. Moreover, the polymer nano-particles are preferably spherical, though shape defects are acceptable, provided the nano-particles generally retain their discrete nature with little or no polymerization between particles. As can be learned from NMR analysis, the polymer nano-particles contain typically 1% to 99% of conjugated diene and 99% to 1% of alkenyl arene, for example 50/50 butadiene and styrene. For the poly(conjugated diene) block, the cis, trans, and vinyl structures are 0~40%, 0~40%, and 0~100% respectively. As an example, in one specific embodiment, a polybutadiene block contains 22% cis, 18% trans and 60% vinyl structures.

For the polymer nano-particle product, its poly(conjugated diene) block can be further functionalized with an enophile reagent. Enophile is a compound with electron-deficient multiple bonds such as carbonyl, thiocarbonyl, nitroso, and imine, among others. The enophile used in the present invention preferably contains at least one azo group, more preferably, one azo and one carbonyl group, and most preferably, two carbonyl groups separated by an azo group. Exemplary enophiles include, but are not limited to, azodicarboxylate compounds as shown below:

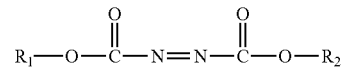

$R_1$ and $R_2$ are each independently methyl, ethyl, propyl, isopropyl, n-butyl, sec-butyl, pentyl, hexyl and the like.

When an enophile reagent is added to an alkene having an allylic hydrogen (ene), a pericyclic ene reaction or Alder-ene reaction can occur, as illustrated below, between the electron-deficient multiple bond and the ene group:

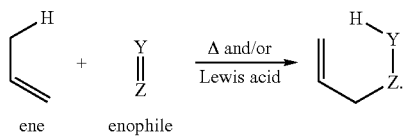

In the ene reaction, a new σ bond is formed between the two unsaturated termini, with allylic shift of the ene double bond, and the allylic hydrogen is transferred to the enophile. The reaction can optionally be promoted with heating and Lewis acids such as $BF_3 \cdot O(CH_2CH_3)_2$, $SnCl_4$, $Al(CH_2CH_3)Cl_2$, $Al(CH_3)_2Cl$, and the like.

Poly(conjugated diene) block of the polymer nano-particles according to the present invention contains ene group, which provides the chemical basis for enophile functionalization via an ene reaction. For example, when the enophile is diisopropyl azodicarboxylate and the ene is poly(1,3-butadiene) block of the polymer nano-particle, the ene reaction between them is believed, although with no intention to be limited by any theory, to yield one or more products as shown in the following scheme:

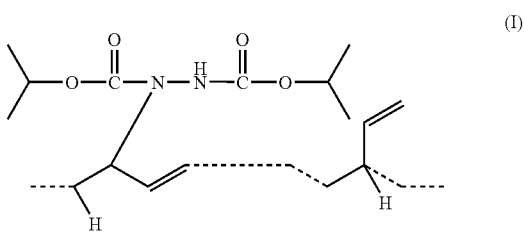

(I)

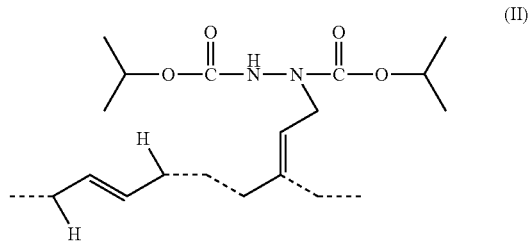

(II)

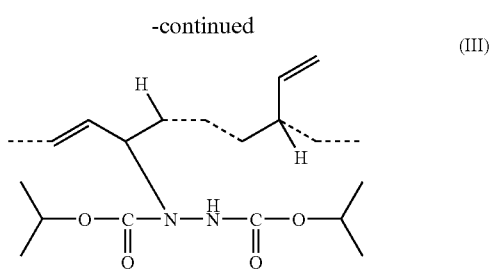

(III)

Preferably, the ene reaction is conducted with agitation, elevated temperature such as up to 115° C., and reflux etc. for a sufficient period of time such as 7 hours. The product was dropped into hexane. Before further use, the ene reaction products are preferably washed several times with a non-aromatic solvent such as hexane. The enophile-functionalized polymer nano-particles of the present invention can be analyzed and characterized by routine measurements such as H-NMR, $C_{13}$-NMR, Atomic Force Microscopy (AFM), and GPC (with polystyrene/THF as standard) etc. The nano-particles have a number average molecular weight of between about 1,000 and 10,000,000, preferably between about 1,000 and 1,000,000, for example, around 850,000. The polydispersity of the molecular weight is preferably less than about 2.0, more preferably less than about 1.5, and most preferably less than about 1.3, for example, around 1.09. The nano-particles contain up to 300, preferably up to 100, such as 80, parts of chemically bonded enophile over one hundred parts (by weight) of the polymer nano-particles.

Aluminum (III) can be introduced and diffused into the enophile functionalized poly(conjugated diene) block by contacting it with an aluminum alkoxide. The aluminum alkoxide or alcoholate used in the present invention can be any compound with a general formula of $Al(OR_3)(OR_4)(OR_5)$, in which $R_3$, $R_4$, and $R_5$ are each independently selected from the group consisting of methyl, ethyl, propyl, isopropyl, butyl, sec-butyl, pentyl, and hexyl. When an aluminum alkoxide contacts the enophile functionalized polymer nano-particle, it is believed that the aluminum alkoxide will migrate to the enophile positions or neighborhood, where one or more of the (—$OR_3$), (—$OR_4$), and (—$OR_5$) groups may take an acidic hydrogen from the enophile functionalized polymer nano-particle, resulting in a negative or partially negative group such as —$N^-$ or —$N^{\delta-}$—, to which an aluminum ion can non-covalently bind on. By doing so, an aluminum cation can be internally complexed in, and therefore distributed or dispersed throughout, the poly(conjugated diene) region. As such, the internal architecture, the number, and the density of the enophile functionalized groups in the poly(conjugated diene) region such as shell of the nano-particles, will dictate the spatial arrangement of the aluminum cations. In a sense, the enophile functionalized polymer nano-particle can be regarded as nano-sized organic container, nano-sized reactor, template, matrix, and the like, as can be envisioned by a skilled artisan in the art.

The retained aluminum cationic species are not covalently bonded to the polymer nano-particle, they can undergo chemical reactions in accordance with their nature and reactivity. As opposed to small molecular complexing agents, polymer nano-particles do not hinder the formation of new chemical compounds from the aluminum ions, but retain the new compound(s) in or nearby where they were. In the presence of an apposite amount of water, $Al^{3+}$ will be hydrolyzed, and $Al(OH)_3$ will be formed, discretely crystallized, and distributed on or in the polymer nano-particle, particularly, the poly(conjugated diene) location. In an embodiment of the present invention, the $Al(OH)_3$ nano-particles are formed in the vicinity of the azocarboxylate groups, and bind to them through a loose acid/base interaction, as illustrated in exemplary Formula (IV) below. Consequently, $Al(OH)_3$ nano-sized particles can be supplied as particles embedded in the host block copolymer or they can be detached and separated from the block copolymer by an appropriate shift in pH level and later centrifugation etc.

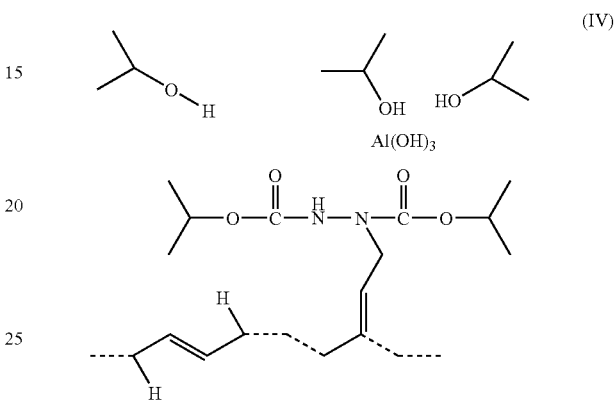

(IV)

Because, on an microscopic level, the reactant Al(III) is dispersed throughout the poly(conjugated diene) regime, the size and size-distribution of the distributed $Al(OH)_3$ particles are determined and controlled by their host enophile functionlized polymer nano-particles. In a preferred embodiment of the present invention, the size of the $Al(OH)_3$ particles is controlled to be within a magnitude of less than 50 nanometers, preferably 5~10 nanometers.

In a specific embodiment, it has been observed that THF is a good solvent for the block copolymer. Using THF solvent in fact can dissolve the polymer molecules around the particles. As a result, the nano-sized $Al(OH)_3$ crystals aggregated to clusters of micrometers and settled out from the solution. This phenomenon allows separation of the nanoparticles from the block copolymer by using simple centrifuge or filtration. The polymer and the solvent can then be recycled or reused again.

The nano-sized $Al(OH)_3$ particles of the present invention can be industrially utilized in a variety of ways. For example, the $Al(OH)_3$ particles can be directly used in rubber compounding, in which only their host polymer serves as the rubber ingredient for the rubber compounding. In another example, the $Al(OH)_3$ particles, separated or not separated from their host polymer, can be used in rubber compounding with other rubbery elastomers. Examples of other rubbery elastomers include, but are not limited to, natural rubber, low-vinyl polybutadiene, cis-1,4-polybutadiene, amorphous 1,2-polybutadiene, low-vinyl polyisoprene, cis-1,4-polyisoprene, polyisobutylene, neoprene, ethylene-propylene copolymer rubber (EPR), styrene-butadiene rubber (SBR), styrene-isoprene rubber (SIR), styrene-isoprene-butadiene rubber (SIBR), styrene-butadiene-styrene block copolymer (SBS), styrene-butadiene block copolymer (SB), hydrogenated styrene butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene-styrene block copolymer (SEPS), hydrogenated styrene-isoprene block copolymer (SEP), polysulfide rubber, acrylic rubber, urethane rubber, silicone rubber, epichlorohydrin rubber, and the like. Mixtures of the above rubbery elastomers may also be used. These rubbery elastomers are well known and are commercially available. Also, those skilled in the art will be able to readily synthesize these rubbery elastomers by using techniques that are well known in the art. Using the nano-sized Al(OH)$_3$ particles of the present invention in rubber compounding can beneficially improve the properties of the final products, such as bound rubber, tensile strength, tear strength, and wet traction etc. For example, nano-sized Al(OH)$_3$ shows strong interactions with diene rubber. It can be used to improve rubber properties (e.g., for increasing carbon gel, increasing $T_b/E_b$, tear Strength and G'). In addition, adding nano-sized Al(OH)$_3$ into a rubber formulation can effectively improve the wet traction, with minimal loss of wear.

In rubber compounding, a variety of desired additives can optionally be added to the rubber composition. Typical additives include filler, processing aids, activators, processing aids, tackifiers, stabilizers, age resistors, sulfur, antioxidants and antiozone compounds, extenders, plasticizers, blowing agents, pigments, and accelerators etc. When necessary, such as a rubber subject to compounding is partially crystallized, the rubber can be heated before it will yield to mixing. As a skilled artisan knows, stabilizers such as amines and phenols can help the rubber withstand oxidative, ageing and ozone attack, by intercepting the active free radicals breaking the free-radical-associated degradation process. Reinforcing filler such as carbon black, presumably by adhesion its surface to rubber, are able to improve the mechanical properties such as hardness, abrasion resistance, modulus, and tear resistance etc., and to provide other benefits such as retarding UV degradation, increasing electrical conductivity, reducing triboelectric charging, and acting as an antistatic material. In a specific embodiment of the present invention, to be added in the rubber compounding include carbon black (N343), aromatic oil, zinc oxide, hydrocarbon resin (tackifier), Santoflex 13 (antioxidant), stearic acid, wax, sulphur, cyclohexyl-benzothiazole sulfenamide (accelerator), and diphenylguanidine (accelerator) etc.

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

Example 1

Preparation of TbSt-BR Diblock Copolymer

To a 32 oz. nitrogen purged bottle, 400 ml of pure hexane, 20 ml of t-butyl styrene, and 0.5 ml of 1.54M butyl lithium were added. Then, the bottle was placed into a water bath of 80° C. for reaction. The bottle was shaken for 40 minutes. Then, 100 g of 1,4-Butadiene/Hexane blend (21.4 wt %) was added to the bottle. After additional 40 minute reaction, the reaction was terminated by charging the bottle with 1 ml isopropanol. After evaporating the solvent, a small amount of the product was taken for GPC analysis. The GPC analysis, using polystyrene/THF as the standard, showed that the polymer had a number average molecular weight of 58000. The polydispersity of the molecular weight was 1.19. The conversion of the reaction is about 100%. The product is a linear diblock copolymer, containing 45 wt % of t-butyl styrene monomer unit and 55 wt % of butadiene monomer unit.

Example 2

Preparation of Azocarboxylated Diblock Copolymer

A 300 ml three-neck round-bottom flask was used for the preparation. The middle neck was connected with a mechanical string motor. The left neck was used to reflux the solvent. The right neck was used for placing the thermometer. At 23° C., 110 g of the toluene solution contained 10% of the product from Example 1 was added to the flask. Then, to the flask was charged 10 g diisopropyl azodicarboxylate (From Aldrich). After that the solution in the flask was purged with nitrogen for 1 hour. Then, the flask was heated up to 115-120° C. The reaction was continued at that temperature for 8 hours. After evaporation of the solvent, a light-yellow solid product was obtained. The conversion of the grafting reaction was 100%.

Example 3

Preparation of Nano-sized Al(OH)$_3$ Particles

First, two 40 ml bottles were charged with following materials. Those bottles were then named as bottles A and B respectively. The material inside those bottles was named accordingly as material A and material B respectively. In Bottle A, 0.5 g of the products from Example 2 was added into 15 g hexane solvent. After vigorous stirring for 1 hour, the azocarboxylated PBd-TbST were dissolved. The solution is completely transparent. In Bottle B, 0.5 g Al(Isopropoxide)$_3$ was added into 15 g toluene solvent. After vigorous stirring for 1 hour, the solution is completely transparent.

The bottle A was then charged with 2.0 ml of solution from the Bottle B and 0.5 ml of water. The solution was shaken for 1 hour. A small drop of the final solution was placed on a copper microgrid. After the solvent evaporated, the surface was then examined under transmission electron microscopy (TEM). FIG. 1 shows the TEM image, indicating that the material containing nano-sized Al(OH)$_3$ crystals.

The Al(OH)$_3$ nanoparticles are formed in the vicinity of the azocarboxylate groups but not bound to them chemically but through a loose acid/base interaction. Consequently, Al(OH)$_3$ nanoparticles can be supplied as particles embedded in the host block copolymer or they can be detached and separated from the block copolymer by an appropriate shift in pH level and later centrifugation etc.

Example 4

Separation of Al(OH)$_3$ Nano-sized Particles

Figure 4:
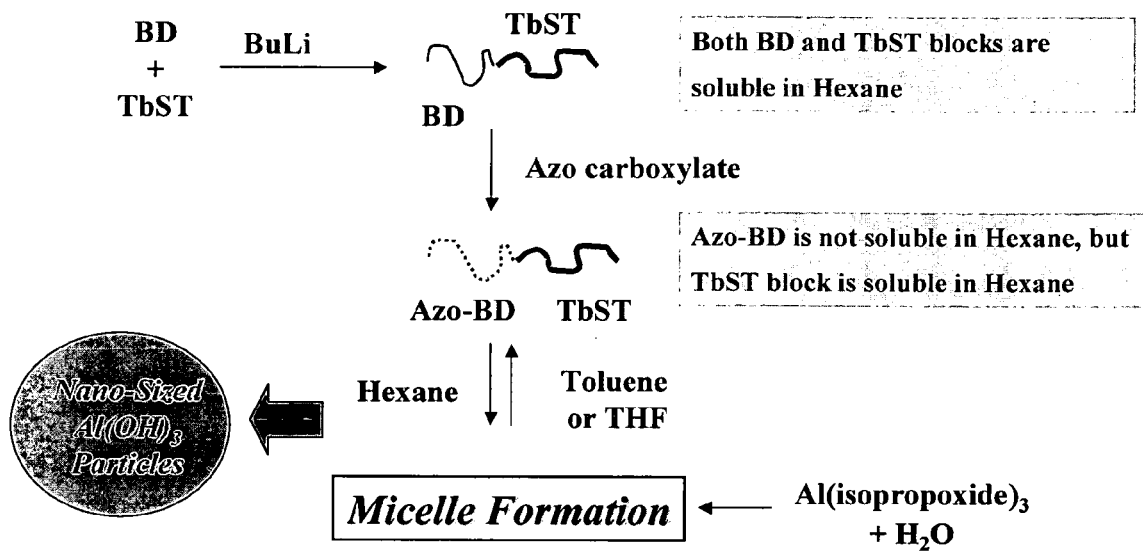
FIG. 4 shows a schematic process of making nano-sized $Al(OH)_3$ particles in accord with one aspect of the present invention.

About 1 ml of the solution prepared according to Example 3 was further diluted by 10 times using THF. It should be noted here that THF is a good solvent for the block copolymer. Using THF solvent in fact dissolved the polymer molecules around the particle. As a result, the nano-sized Al(OH)$_3$ crystals aggregated to clusters of micrometers and settled out from the solution. This phenomenon is very important since it allows one to separate the nanoparticles from the block copolymer by using simple centrifuge or filtration. The polymer and the solvent can then be recycled or reused again. It has been discovered that after separation the aggregated particles can be re-dispersed in hexane by adding some of the copolymer. The separation process has a great industrial value. FIG. 4 shows the schematic process of making nano-sized Al(OH)$_3$ particles.

Example 5

Preparation of St-BR Particle Polymers

A 2-gallon polymerization reactor was used for the preparation. The reactor was first charged with 1.14 lbs. of hexane, then was charged with 2.28 lbs. of butadiene/hexane blend that contained 21.7 wt % of butadiene. The reactor was then heated to 135° F. After the temperature stabilized, the reactor was first charged with 2.51 ml of 1.6 M solution of OOPS. The polymerization was then initiated 5.0 ml of a 1.68 M solution of butyl lithium in hexane. The batch temperature was maintained at 135° F. for the duration of the polymerization. After 2 hours (when the reaction was finished), the reactor was charged with 1.50 lbs. of styrene/hexane blend that contains 33 wt % of styrene. After additional two-hour reaction, the reactor was charged with 4 lbs. of hexane. After another additional 20 minutes, the reactor was charged with 50 ml of divinyl benzene. The reactor was then maintained at 135° F. for another two-hour period, and a small amount of the product was taken for GPC analysis. The GPC analysis of the product, using polystyrene/THF as the standard, showed that the micelle polymer had a number average molecular weight of 893700. The polydispersity of the molecular weight was 1.13. The conversion of the reaction is about 100%. The NMR analysis showed that the product contains 50% of butadiene and 50% of styrene. The polybutadiene contains 22% cis, 18% trans and 60% vinyl structures. The product was finally dropped into isopropanol. After precipitation, the product was drum dried.

Example 6

Preparation of Azocarboxylated Particle Polymers

A 2,000 ml three-neck round-bottom flask was used for the preparation. The middle neck was connected with a mechanical string motor. The left neck was used to reflex the solvent. The right neck was used for placing the thermometer. At 23° C., 740 g of the toluene solution contained 10% of the product from Example 5 was added to the flask. Then, to the flask was charged 100 g diisopropyl azodicaboxylate (From Aldrich). After that, the solution in the flask was purged with nitrogen for 1 hour. Then, the flask was heated up to 115° C. and held at the temperature for 7 hours. The product was dropped into hexane. A light-yellow product was precipitated from the hexane solution. The product was finally washed with using hexane for five times. The GPC analysis of the product, using polystyrene/THF as the standard, showed that the polymer had a number average molecular weight of 851200. The polydispersity of the molecular weight was 1.09. $C_{13}$ NMR analysis C=O and styrene showed that the product contained about 79 parts of chemical bonded diisopropyl azocarboxylate over one hundred parts (by weight) of the polymer of Example 5. The product was soluble in methanol, ethanol, isopropanol, THF, chloroform, toluene, but not soluble in hexane and cyclohexane.

Figure 2:
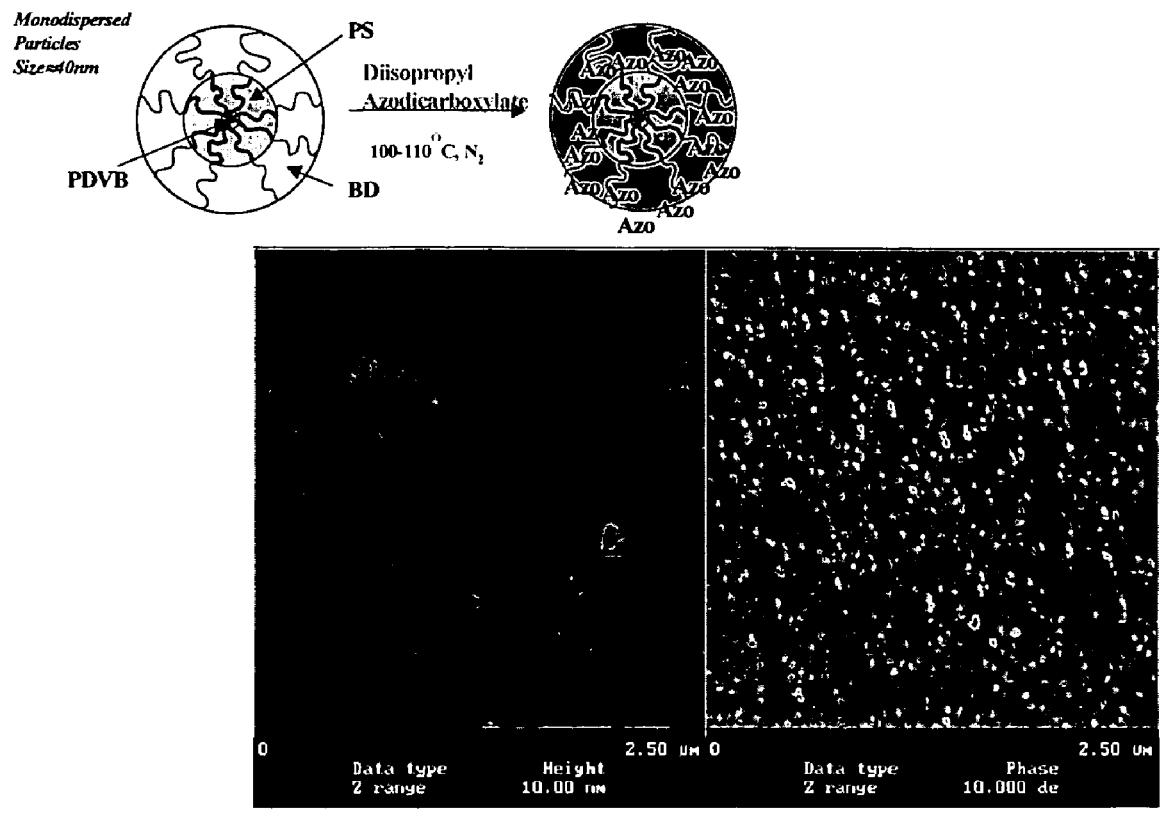
FIG. 2 shows the atomic force microscopy (AFM) image of azocarboxylated butadiene-styrene copolymer nano-particles in accord with one aspect of the present invention.

For microscopy observation, a small amount (~10 mg) of the product was first dissolved into toluene. Then, a small drop of the toluene solution was placed on a newly cleaved graphite surface. After the solvent evaporated, the surface was then examined under atomic force microscopy (AFM). FIG. 2 shows the AFM image, indicating that the material is nano-sized particles.

Example 7

Preparation of Nano-sized Al(OH)$_3$ Polymer Nanocomposite Particles

First, four 40 ml bottles were charged with the following materials. Those bottles were then named as bottle A, B, and C, respectively. The material inside those bottles was named accordingly as material A, B, and C, respectively. In Bottle A, 0.5 g of the products from Example 6 was added into 15 g toluene solvent. After vigorous stirring for 1 hour, the azocarboxylated particles were dissolved. The solution is completely transparent. In Bottle B, 0.5 g of the products from Example 6 was added into 15 g THF solvent. After vigorous stirring for 1 hour, the azocarboxylated particles were dissolved. The solution is completely transparent. In Bottle C, 0.5 g Al(isopropoxide)$_3$ was added into 15 g toluene solvent. After vigorous stirring for 1 hour, the azocarboxylated particles were dissolved. The solution is completely transparent.

Figure 3:
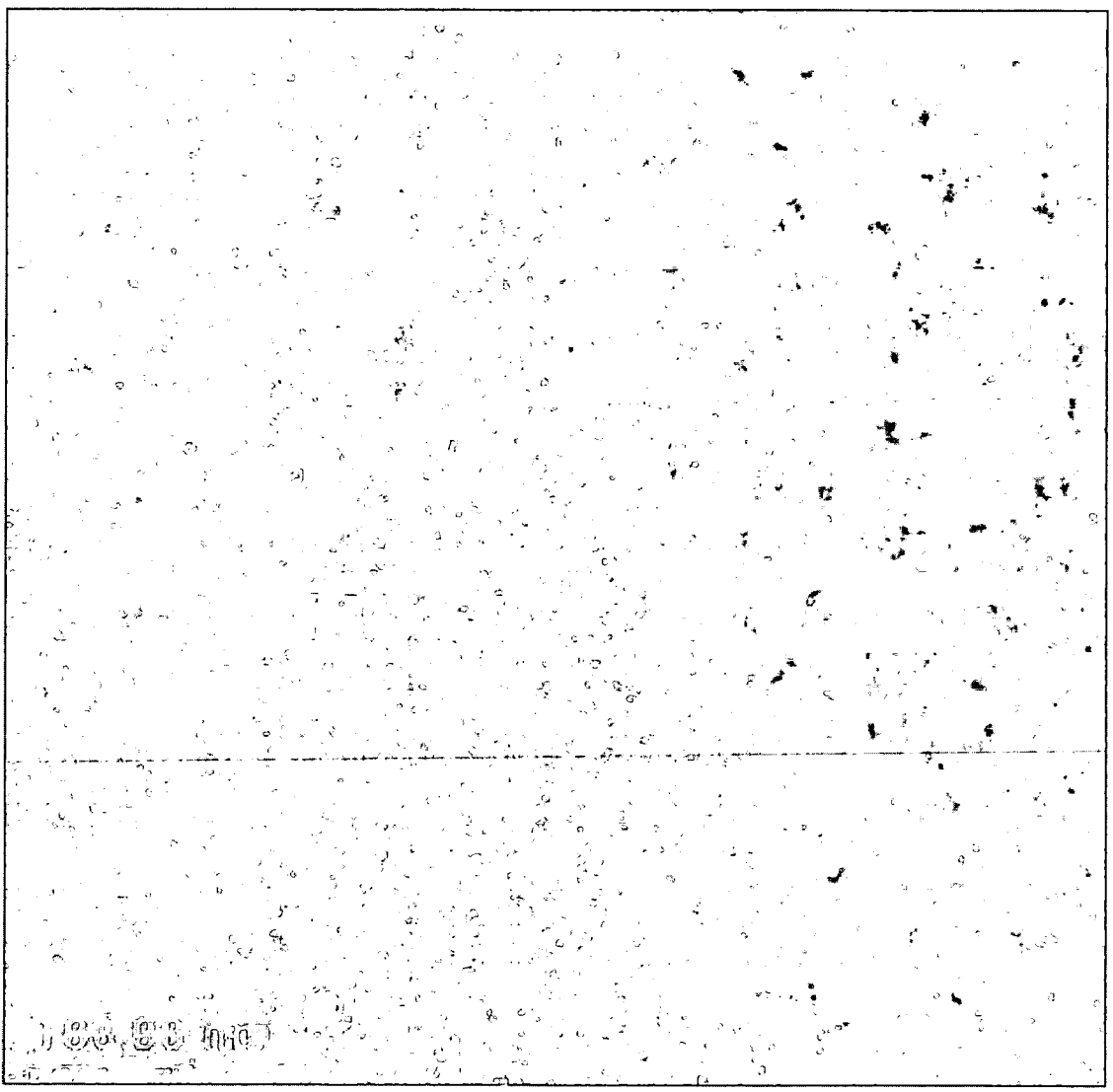
FIG. 3 shows the atomic force microscopy (AFM) image of nano-sized $Al(OH)_3$ crystals dispersed in azocarboxylated butadiene-styrene copolymer nano-particles in accord with one aspect of the present invention.

The Bottle A was then charged with 1.5 ml of solution from Bottle C and 1.5 ml of water. The solution was shaken for 1 hour. The resulted solution looked like emulsified solution. After diluted with toluene 10 times, it becomes transparent again. A small drop of the final solution was placed on a copper micro-grid. After the solvent evaporated, the surface was then examined under transmission electron microscopy (TEM). FIG. 3 shows the AFM image, indicating that the material containing nano-sized Al(OH)$_3$ crystals.

Example 8

Al(OH)$_3$ Cluster

The bottle B was then charged with 1.5 ml of solution from bottle C and 1.5 ml of water. The solution was then shaken for 1 hour. The resulted material is not a solution. Al(OH)$_3$ crystals form big clusters and precipitated.

Example 9

Preparation of Azocarboxylated Particle Polymers

A 2-gallon polymerization reactor was used for the preparation. The reactor was first charged with 2.36 lbs. of hexane, then was charged with 4.56 lbs. of butadiene/hexane blend that contained 22.4 wt % of butadiene. The reactor was then heated to 135° F. After the temperature stabilized, the reactor was first charged with 2.5 ml of 1.68 M solution of butyl lithium in hexane. The batch temperature was maintained at 135° F. for the duration of the polymerization. After 2 hours (when the reaction was finished), the reactor was charged with 0.78 lbs. of styrene/hexane blend that contains 33 wt % of styrene. After additional two-hour reaction, the reactor was charged with 6 lbs. of hexane. After another additional 20 minutes, the reactor was charged with 50 ml of divinyl benzene. The reactor was then maintained at 135° F. for another two-hour period, and 1 ml isopropanol was added to stop the anionic reaction. After that, 100 g diisopropyl azodicarboxylate was added into the reactor. The temperature was then set to 220° F., after 16-hour ene-reaction. The reaction was stopped and material was dropped out of the reactor.

Example 10

Preparation of Nano-sized Al(OH)₃ Particles

The half of the product from Example 9 was further dissolved into toluene and then diluted to about 6% wt concentration in a big container. With string, a solution that contained 0.5 lb. Al(isopropoxide)₃ (from Aldrich) and 0.4 lb. water was added to the container. After about 2 hours string, the solution was first concentrated with blowing in the nitrogen gas, and was then drum dried. TGA results show that the material contains about 12% Al₂O₃.

Examples 11-12

Application of the Particles in Rubber Compounds

Two kinds of rubber compositions were prepared according to the formulation shown in Tables 1 and 2 by selectively adding the Al(OH)₃ particles to the compound formulation. In each sample, a blend of the ingredients was kneaded by a method listed in Table 3. The final stock was sheeted and molded at 160° C. for 30 minutes.

TABLE 1

Composition for Mater Batch

|  | Example 11 | Example 12 |
| --- | --- | --- |
| Polymer from Example 9 | 100.00 |  |
| Polymer from Example 10 |  | 112.00 |
| Carbon Black (N343) | 50.00 | 50.00 |
| Aromatic Oil | 15.00 | 15.00 |
| Zinc Oxide | 3.00 | 3.00 |
| Hydrocarbon Resin (tackifiers) | 2.00 | 2.00 |
| Santoflex 13 (antioxidants) | 0.95 | 0.95 |
| Stearic Acid | 2.00 | 2.00 |
| Wax | 1.00 | 1.00 |

TABLE 2

Composition for Final Batch

|  | Example 11 | Example 12 |
| --- | --- | --- |
| Sulphur | 2.10 | 2.10 |
| Cyclohexyl-benzothiazole sulfenamide (accelerator) | 1.40 | 1.40 |
| Diphenylguanidine (accelerator) | 0.20 | 0.20 |

TABLE 3

Mixing Conditions

| Mixer: 300 g Brabender Mater Batch Stage | Agitation Speed: 60 rpm |
| --- | --- |
| Initial Temperature | 110° C. |
| 0 min | charging polymers |
| 0.5 min | charging oil and Carbon Black |
| 5.0 min | Drop |
| Final Batch Stage |  |
| Initial Temperature | 75° C. |
| 0 sec | charging master stock |
| 30 sec | charging curing agent and accelerators |
| 75 sec | Drop |

On the vulcanized rubber compounds of Examples 11 and 12, measurement of the tensile strength, tear strength, hysteresis loss gave the results as shown in Table 4. Measurement of tensile strength is based on conditions of ASTM-D 412 at 22° C. Test specimen geometry was taken the form of a ring of a width of 0.05 inches and of a thickness of 0.075 inches. The specimen was tested at a specific gauge length of 1.0 inch. The measurement of tear strength is based on conditions of ASTM-D 624 at 170° C. Test specimen geometry was the form of a nicked ring (ASTM-624-C). The specimen was tested at the specific gauge length of 1.750 inches. The hysteresis loss was measured with a Dynastat Viscoelastic Analyzer. Test specimen geometry was that of a strip of a length of 30 mm and of a width of 15 mm. The following testing conditions were employed: frequency 5 Hz, 2% strain. Measurement of the wet traction was performed on the British Portable Skid Tester, which is specified in Road Research Laboratory Technical Paper No. 66 by C. G. Giles et al. London, 1966. The sample geometry for the test is a rectangle bar of 1×3×0.25 inches.

TABLE 4

Effect of Nano-Sized Al(OH)₃ on Rubber Compound

|  | Control | Test |
| --- | --- | --- |
| Polymer of Example 9 | 100 | 100 |
| ~10 nm Al(OH)₃ | 0 | 12 |
| Carbon black, N343 | 50 | 50 |
| Sulfur content | 2.1 | 2.1 |
| Cure Property, Bond Rubber (%) | 25.6 | 46.9 |
| Room Temp Ring Tensile, 23° C. |  |  |
| Tb (MPa) | 18.93 | 22.58 |
| Eb (%) | 334 | 373 |
| M300 | 16.86 | 17.73 |
| M50 | 2.89 | 2.35 |
| High Temp Ring Tensile, 100° C. |  |  |
| Tb (MPa) | 10.17 | 10.91 |
| Eb (%) | 335 | 399 |
| M300 | 8.75 | 7.35 |
| M50 | 0.88 | 1.06 |
| Ring Tear, 170° C. |  |  |
| Strength (kN/m) | 13.7 | 21.1 |
| Travel (%) | 329.4 | 485.3 |
| Rolling Resistance, 50 C tanδ | 0.247 | 0.305 |
| Wet Traction Index |  |  |
| 1) 0° C. loss G" (MPa) | 0.172 | 0.246 |
| 3) BPST Index | 100 | 109 |
| Lanborne Wear Index (65%) | 100 | 92 |

As can be seen in the Table 4, the rubber composition of Example 12 exhibited very well balanced physical properties. The tensile strength and the tear strength of the modified rubber compounds are better than that of the comparative compound (i.e., Example 11) under equal modulus condition. Of most importance, the wet traction of the test compound is about 10% better than that control.

Nano-sized Al(OH)₃ show strong interactions with diene rubbers. It can be used to improve rubber properties in general (e.g., increased C/B gel, increased Tb/Eb, tear strength and G'). Adding Al(OH)₃ can effectively improve the wet traction.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of preparing enophile functionalized polymer nano-particles, which comprises
    forming block copolymer chains having at least a poly(conjugated diene) block and at least a poly(alkenyl arene) block;
    assembling the block copolymer chains into micelles or polymer nano-particles;
    crosslinking the block copolymer with a multiple-alkenyl substituted arene monomer; and
    functionalizing the poly(conjugated diene) block of the polymer nano-particles with an enophile having an electron-deficient multiple bond.

2. The method according to claim 1, in which the conjugated diene monomer comprises a $C_4$-$C_8$ conjugated diene monomer.

3. The method according to claim 1, in which the conjugated diene monomer comprises a diene selected from the group consisting of 1,3-butadiene, isoprene (2-methyl-1,3-butadiene), 2-ethyl-1,3-butadiene, 2,3-dimethyl-1,3-butadiene, piperylene (1,3-pentadiene), 2-methyl-1,3-pentadiene, 3-methyl-1,3-pentadiene, 4-methyl-1,3-pentadiene, 2,4-dimethyl-1,3-pentadiene, 1,3-hexadiene, and mixture thereof.

4. The method according to claim 1, in which the conjugated diene monomer comprises 1,3-butadiene.

5. The method according to claim 1, in which the alkenyl arene is selected from the group consisting of styrene, t-butyl styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, and alkyl, cycloalkyl, aryl, alkaryl, and aralkyl derivatives thereof, and mixture thereof.

6. The method according to claim 1, in which the alkenyl arene monomer comprises styrene or t-butyl styrene.

7. The method according to claim 1, in which forming the block copolymer chains is conducted in a non-aromatic hydrocarbon solvent.

8. The method according to claim 7, in which the non-aromatic hydrocarbon solvent is selected from the group consisting of pentane, hexane, heptane, octane, nonane, decane, cyclohexane, methyl cyclopentane, cyclooctane, cyclopentane, cycloheptane, cyclononane, cyclodecane, and the mixture thereof.

9. The method according to claim 1, in which the copolymerization and micelle assembly are conducted in a temperature of about −70 to 200° C.

10. The method according to claim 1, in which the copolymerization is initiated by an organolithium compound.

11. The method according to claim 1, in which the enophile contains at least one azo group.

12. The method according to claim 11, in which the enophile contains two carbonyl groups separated by at least an azo group.

13. The method according to claim 12, in which the enophile comprises a compound having the formula:

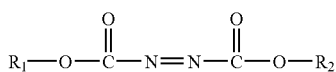

wherein the $R_1$ and $R_2$ are each independently methyl, ethyl, propyl, isopropyl, n-butyl, sec-butyl, pentyl, or hexyl.

14. The method according to claim 13, in which both $R_1$ and $R_2$ are isopropyl.

15. A method of preparing nano-sized inorganic metal particles, which comprises
    forming block copolymer chains having at least a poly(conjugated diene) block and at least a poly(alkenyl arene) block;
    assembling the block copolymer chains into micelles or polymer nano-particles;
    crosslinking the block copolymer with a multiple-alkenyl substituted arene monomer;
    functionalizing the poly(conjugated diene) block of the polymer nano-particles with an enophile having an electron-deficient multiple bond;
    contacting the enophile functionalized poly(conjugated diene) block with an organic metallic compound;
    distributing the organic metallic compound on or in the functionalized poly(conjugated diene) block;
    converting the distributed organic metallic compound to nano-sized inorganic metal particles; and
    optionally isolating the nano-sized inorganic metal particles in a solvent in which the enophile functionalized polymer particles is sufficiently more soluble than the nano-sized inorganic metal particles.

16. The method according to claim 15, in which the metal of the organic metallic compound is selected from the group consisting of Cu, Ti, Fe, Al, Cd, Ni, Pd, Sc, V, Cr, Mn, Co, Zn, Ga, Y, Zr, Nb, Mo, Tc, Ru, Rh, Ag, In, Sn, Sb, W, Re, Os, Ir, Pt, Au, Hg, Tl, Pb, Bi, and the mixture thereof.

17. The method according to claim 15, in which the organic metallic compound is selected from the group consisting of metal alkoxide compounds, metal alkylenyl compounds, metal alkylnitride compounds, and combinations thereof.

18. The method according to claim 15, in which the organic metallic compound comprises aluminum alkoxide.

19. The method according to claim 18, in which the aluminum alkoxide is a compound with a general formula of $Al(OR_3)(OR_4)(OR_5)$, wherein $R_3$, $R_4$, and $R_5$ are each independently selected from the group consisting of methyl, ethyl, propyl, isopropyl, butyl, sec-butyl, pentyl, and hexyl.

20. The method according to claim 19, in which the aluminum alkoxide comprises $Al(OCH(CH_3)_2)_3$.

21. Enophile functionalized polymer nano-particles, which are prepared according to the method of claim 1.

22. The enophile functionalized polymer nano-particles of claim 21, which have a number average molecular weight of between about 1,000 and 10,000,000.

23. The enophile functionalized polymer nano-particles of claim 21, having a polydispersity of less than about 1.5.

24. Nano-sized inorganic metal particles, which are prepared in accord with the method of claim 15, wherein the nano-sized inorganic metal particles have a diameter of 5 to 10 nanometers.

25. A rubber composition including the nano-sized inorganic metal particles prepared in accord with the method of claim 15, wherein the nano-sized inorganic metal particles have a diameter of 5 to 10 nanometers.

26. An enophile functionalized polymer composition comprised of nano-particles comprising poly(conjugated diene) monomer and poly(alkenyl arene) monomer, said nano-particles having an average diameter less than about 100 nm and a number average molecular weight between about 10,000 and 1,000,000 and a poly dispersity less than about 1.8, said nano-particles further comprising enophile and organic metal compounds;

wherein the enophile has an electron-deficient multiple bond;

wherein the nano-particles are cross-linked with a multiple-alkenyl substituted arene.

27. The method of claim 1, wherein the enophile has two or more multiple bonds.

28. The method of claim 15, wherein the enophile has two or more multiple bonds.

29. The enophile functionalized polymer composition of claim 26, wherein the enophile has two or more multiple bonds.

* * * * *